(12) United States Patent
Chao

(10) Patent No.: US 6,474,892 B2
(45) Date of Patent: Nov. 5, 2002

(54) MULTI-PURPOSE CONTAINERS HAVING A FOLDABLE WRITING INSTRUMENT

(75) Inventor: David Chao, Los Altos, CA (US)

(73) Assignee: Contour Optik, Inc., Chiayi (TW)

( * ) Notice: Subject to any disclaimer, the term of this patent is extended or adjusted under 35 U.S.C. 154(b) by 0 days.

(21) Appl. No.: 09/775,156

(22) Filed: Feb. 1, 2001

(65) Prior Publication Data

US 2002/0081140 A1 Jun. 27, 2002

Related U.S. Application Data

(63) Continuation-in-part of application No. 09/607,265, filed on Jun. 30, 2000, now Pat. No. 6,270,274, and a continuation-in-part of application No. 09/625,748, filed on Jul. 26, 2000.

(51) Int. Cl.⁷ .............................................. B43K 29/00
(52) U.S. Cl. ......................................... 401/195; 401/52
(58) Field of Search .................... 401/195, 52, 109, 401/1, 112, 116, 64, 68

(56) References Cited

U.S. PATENT DOCUMENTS

| | | |
|---|---|---|
| 410,798 A | 9/1889 | Long |
| 494,624 A | 4/1893 | Briggs |
| 990,352 A | 4/1911 | Grell |
| 1,472,350 A | 10/1923 | Albanese |
| 1,549,501 A | 8/1925 | Patrick |
| 1,737,964 A | 12/1929 | Esterow |
| 1,784,169 A | 12/1930 | Baumgartner |
| 1,825,906 A | 10/1931 | Jeanneret |
| 1,957,157 A | 5/1934 | Bosch |
| 1,995,664 A | 3/1935 | Boyes |
| D101,073 S | 9/1936 | Tamis |
| 2,060,406 A | 11/1936 | Tiede |
| D106,074 S | 9/1937 | Wewetzer |
| D129,896 S | 10/1941 | Cohen |
| 2,456,904 A  * | 12/1948 | Wahlstrom .................. 401/195 |
| 2,479,472 A | 8/1949 | Coplon |
| 2,553,257 A | 5/1951 | Honeyman |
| 2,567,564 A | 9/1951 | Ingraham |
| 2,622,729 A | 12/1952 | Uttz |
| 2,624,011 A | 12/1952 | Stern |
| 2,732,061 A | 1/1956 | Wilcox |
| 2,746,347 A | 5/1956 | Gaire |
| 2,772,772 A | 12/1956 | Taylor |
| 2,809,766 A | 10/1957 | Anderson |
| 3,036,699 A | 5/1962 | Huber |
| 3,038,593 A | 6/1962 | Root et al. |
| 3,267,980 A | 8/1966 | Bird |
| 3,323,638 A | 6/1967 | Dishart |
| 3,768,634 A | 10/1973 | Creevy |

(List continued on next page.)

Primary Examiner—Gregory L. Huson
Assistant Examiner—Tuan Nguyen

(57) ABSTRACT

Multipurpose containers in which a variety of items can be stored, such as eyeglasses writing instruments pills, medicines, thermometers, rulers, note pads, to name a few of the nearly limitless number of items that can be stored. The containers may be provided with writing implements or gauges to measure a parameter, such as a timepiece, or a computational device, such as a calculator.

11 Claims, 32 Drawing Sheets

U.S. PATENT DOCUMENTS

| | | |
|---|---|---|
| 4,075,702 A | 2/1978 | Davies |
| 4,149,812 A * | 4/1979 | Huffman, Jr. ............... 401/195 |
| 4,296,945 A | 10/1981 | Pavlik |
| 4,336,882 A * | 6/1982 | Sakwa ..................... 401/195 |
| 4,382,687 A * | 5/1983 | Lemelson ................. 401/195 |
| 4,478,330 A | 10/1984 | Lin |
| D286,270 S | 10/1986 | Huang |
| 4,887,896 A | 12/1989 | Akagi |
| 5,186,326 A | 2/1993 | Peckels et al. |
| D352,734 S | 11/1994 | Davis et al. |
| D358,606 S | 5/1995 | Davis et al. |
| 5,423,419 A | 6/1995 | Wentz et al. |
| 5,448,317 A | 9/1995 | Huang |
| 5,775,488 A | 7/1998 | Vaught |
| 5,878,873 A | 3/1999 | Clark |
| 5,929,967 A * | 7/1999 | Conner ..................... 351/158 |
| 5,949,515 A | 9/1999 | Hoshino |
| 6,004,597 A * | 12/1999 | Coleman et al. ........... 401/195 |
| D423,555 S | 4/2000 | Conner |
| 6,145,986 A | 11/2000 | Conner |
| D435,059 S | 12/2000 | Conner |
| 6,270,274 B1 * | 8/2001 | Chao ...................... 401/195 |

\* cited by examiner

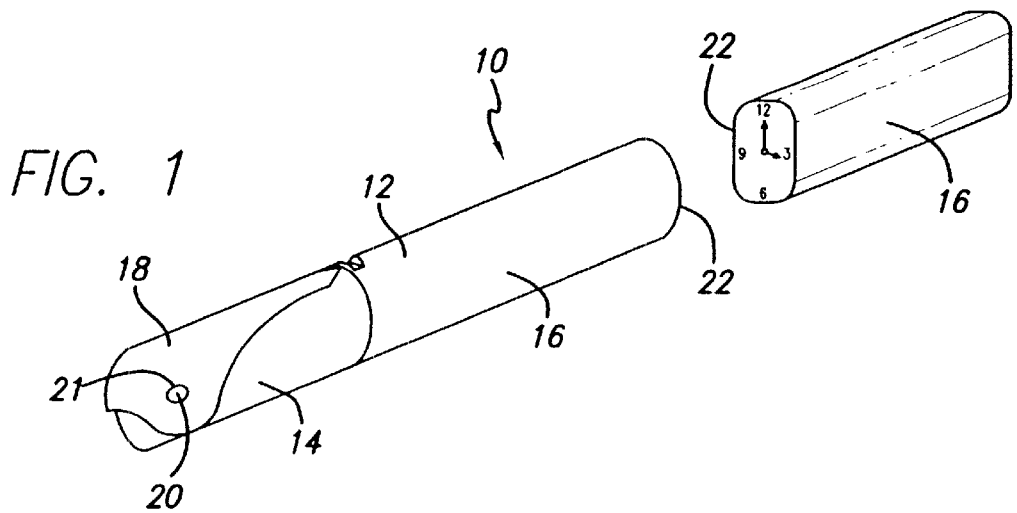
FIG. 1
FIG. 4
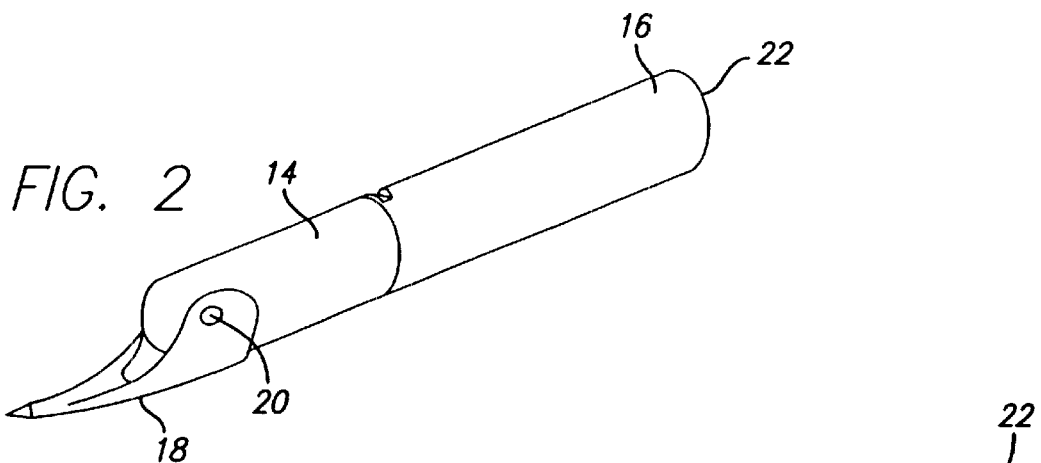
FIG. 2
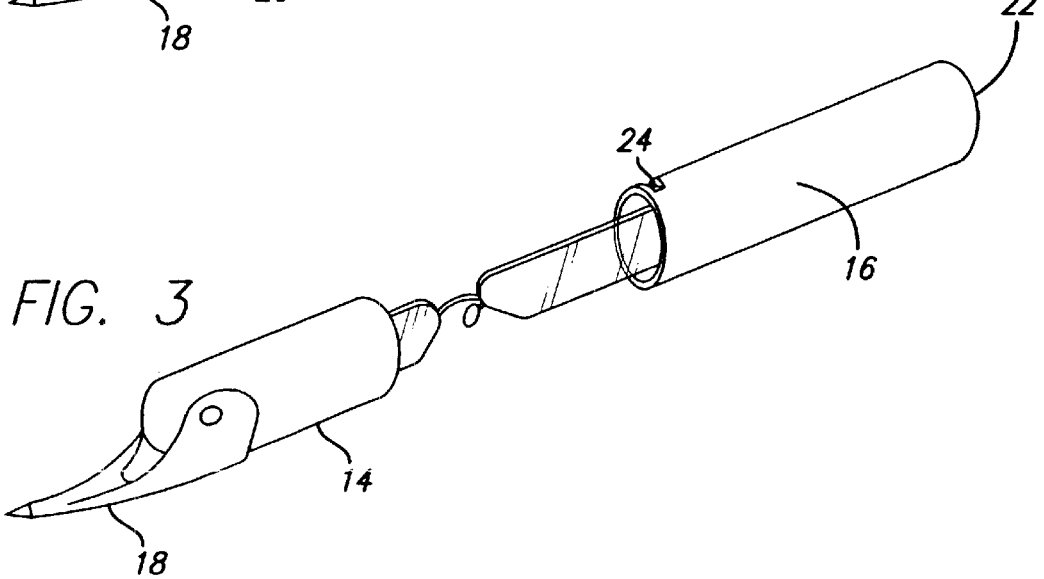
FIG. 3

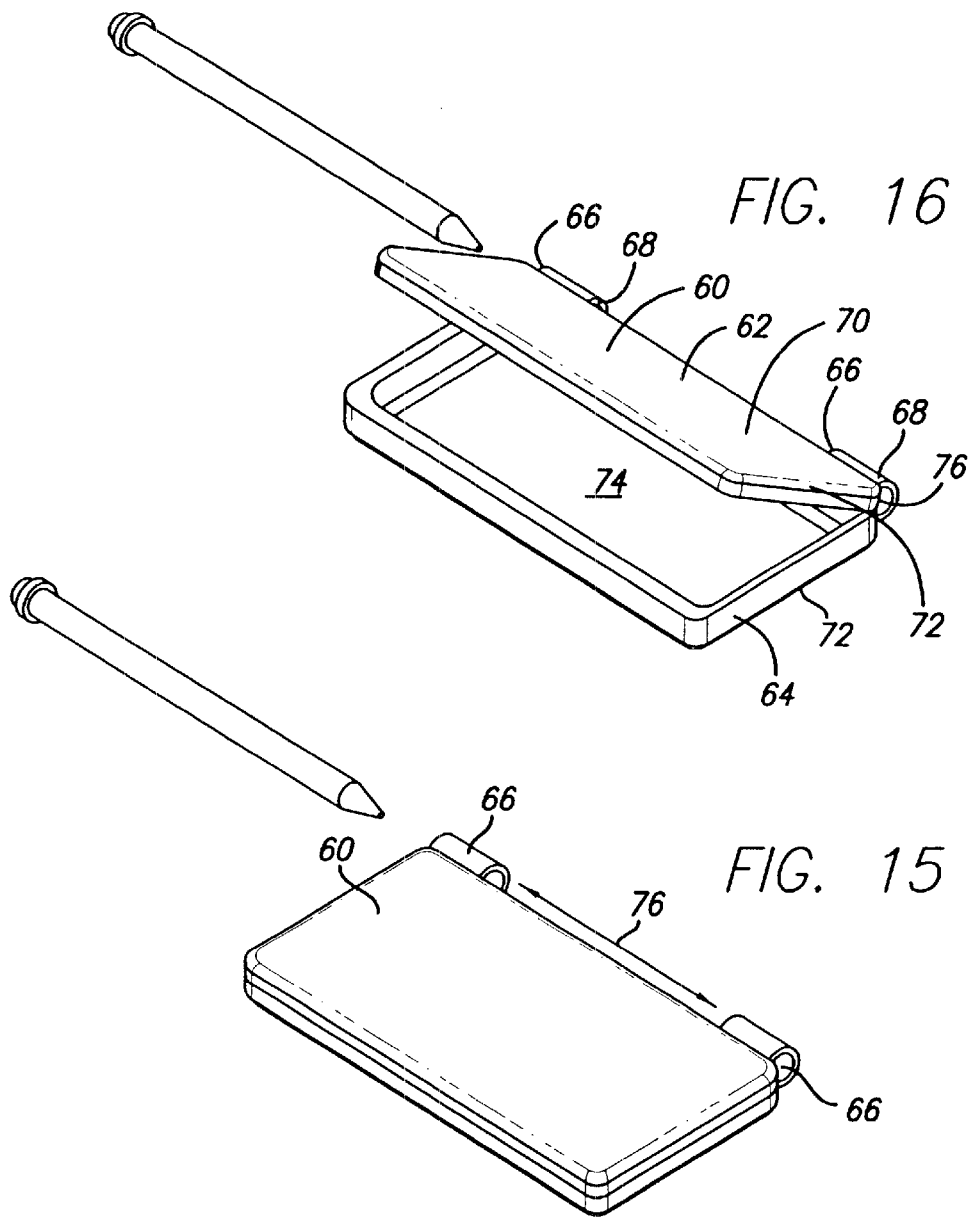
FIG. 16
FIG. 15
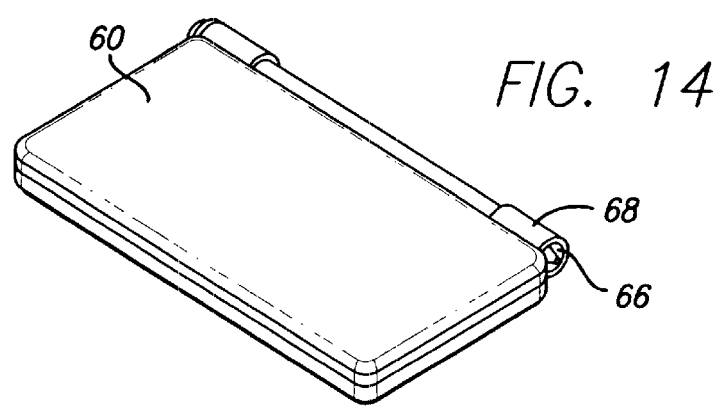
FIG. 14

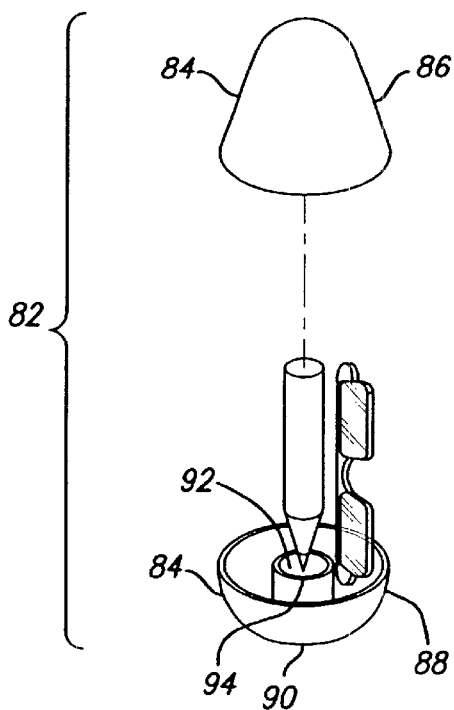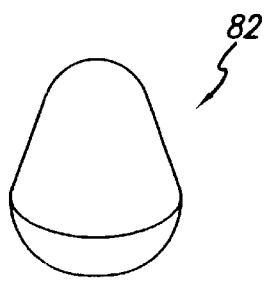
FIG. 20  FIG. 21
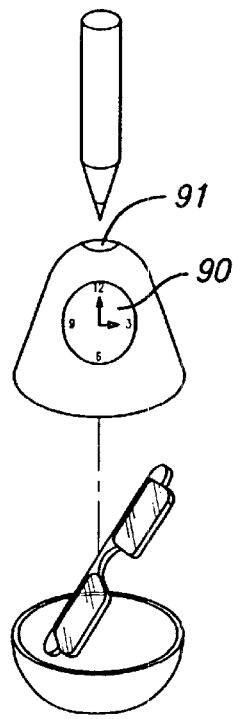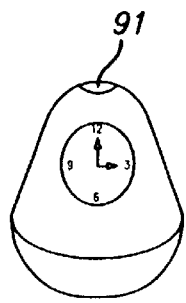
FIG. 22  FIG. 23

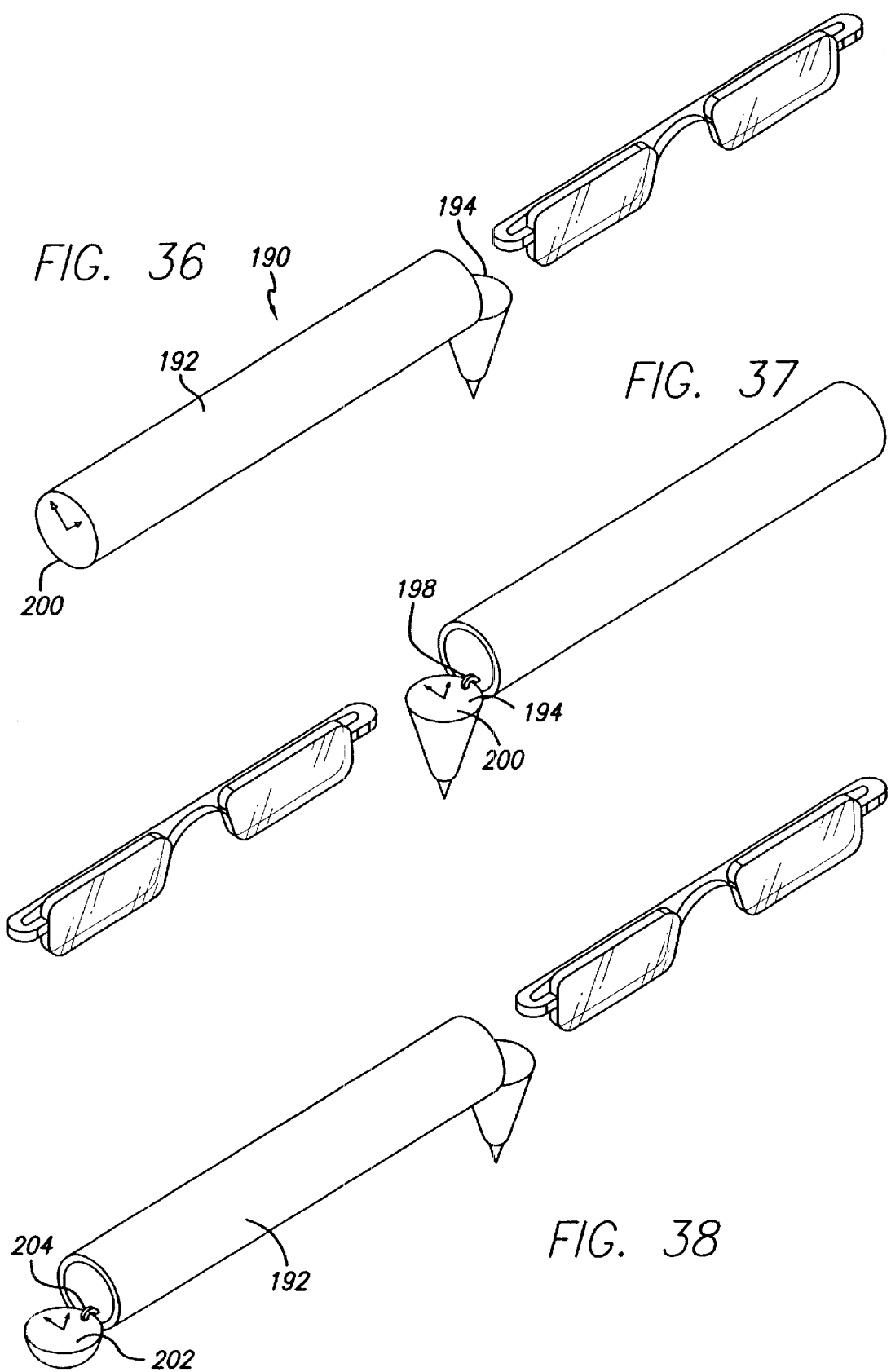

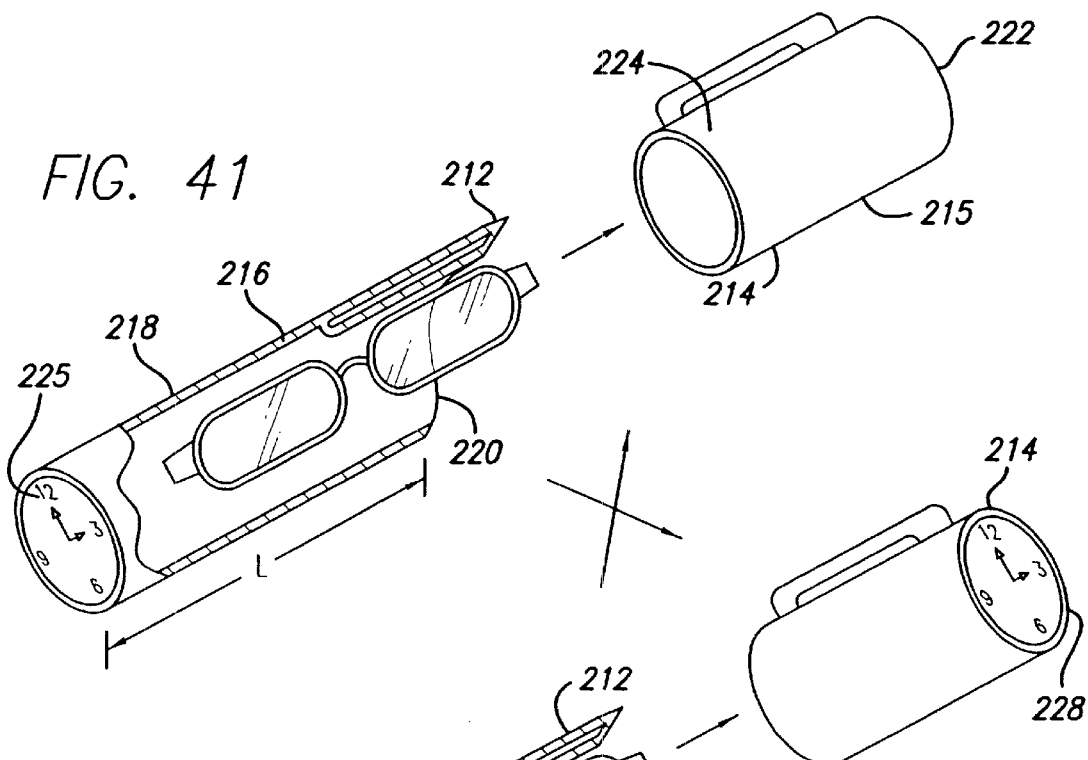
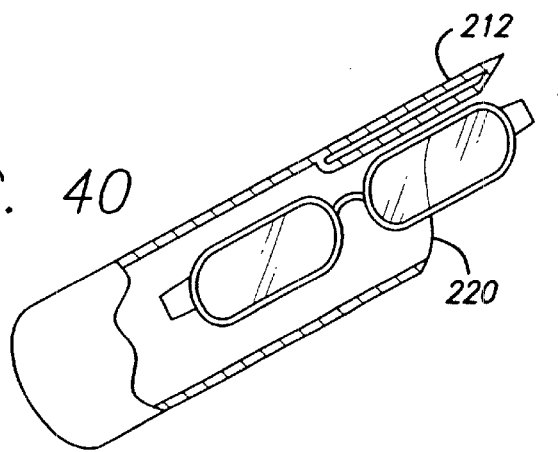
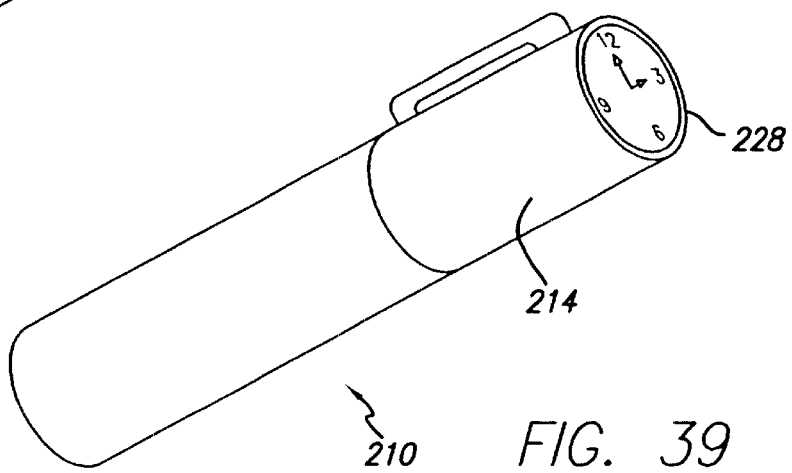

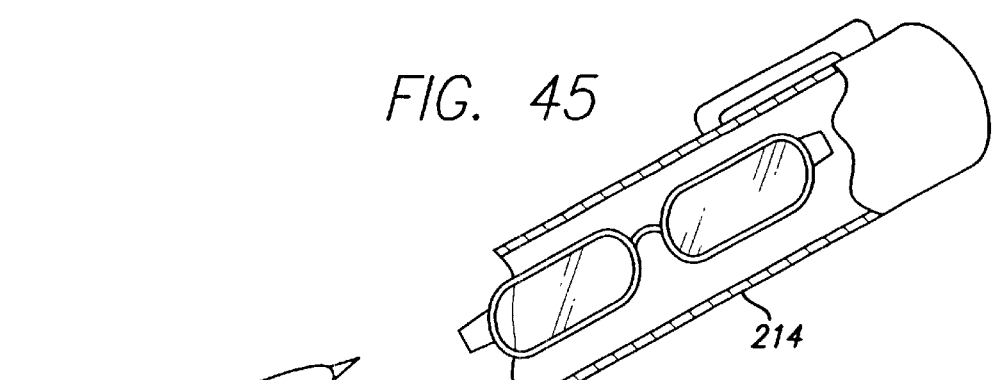
FIG. 45
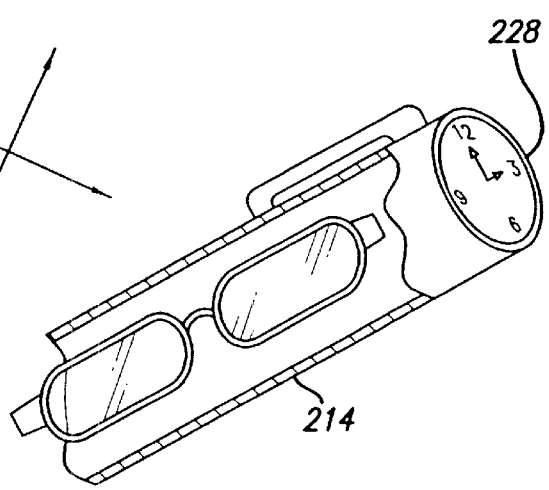
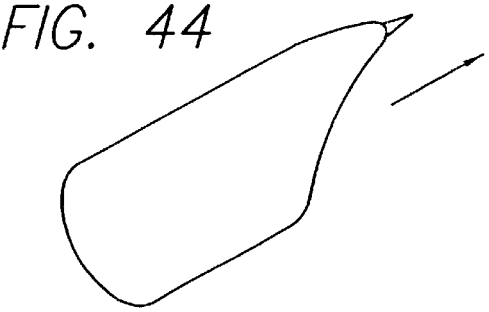
FIG. 44
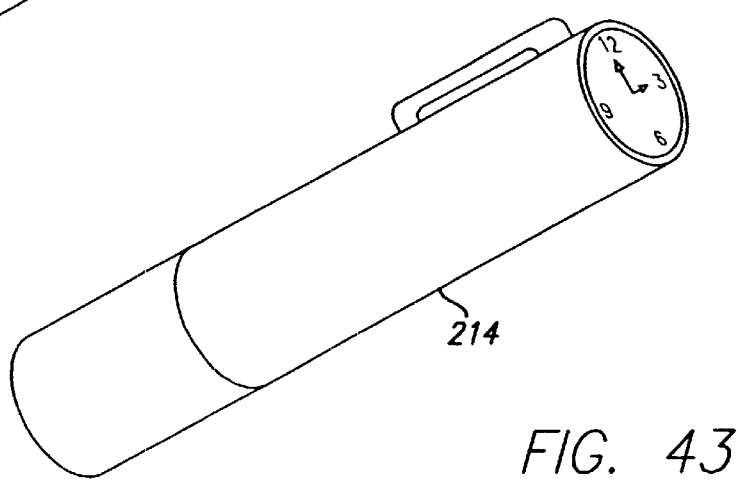
FIG. 43

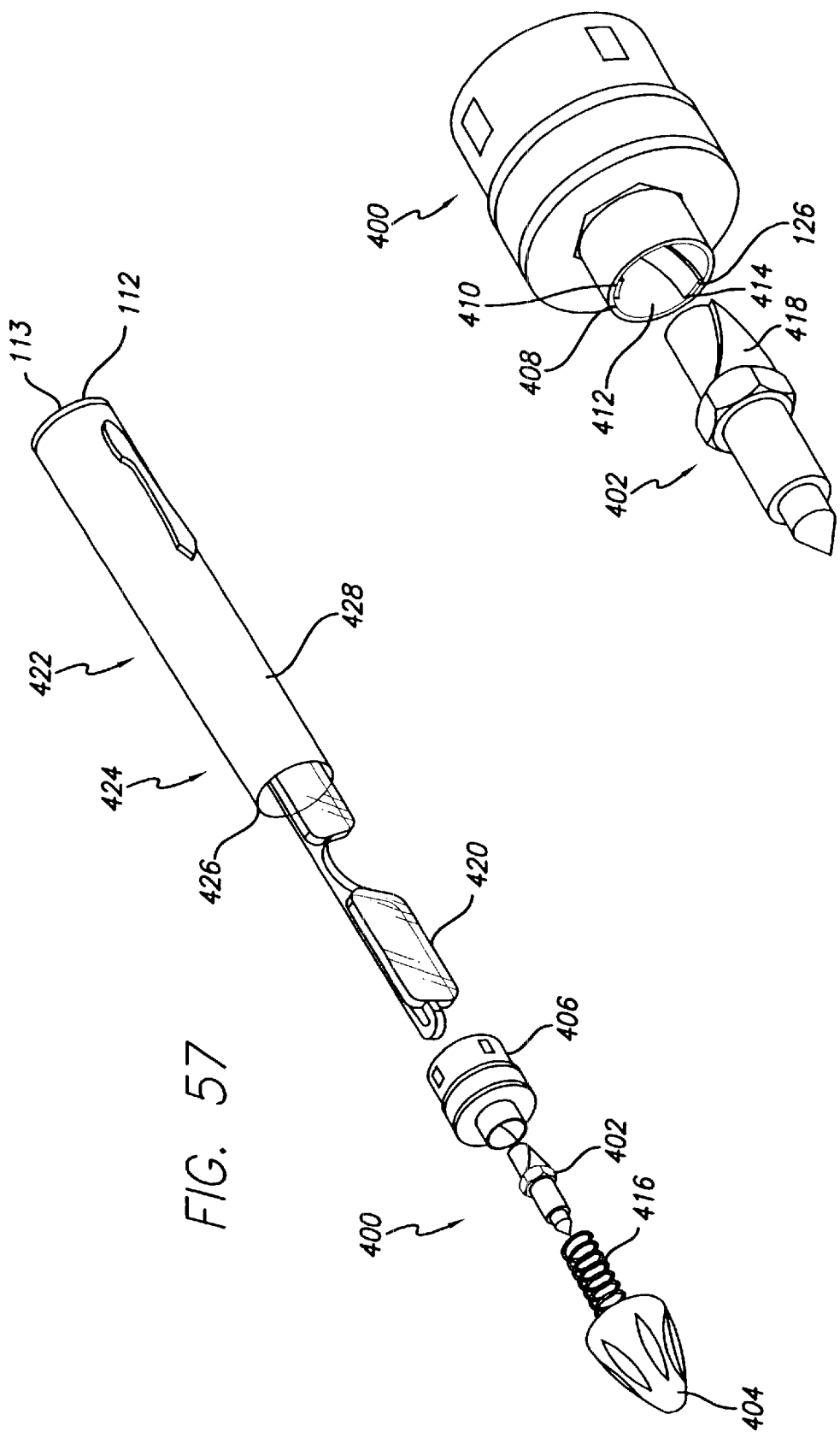

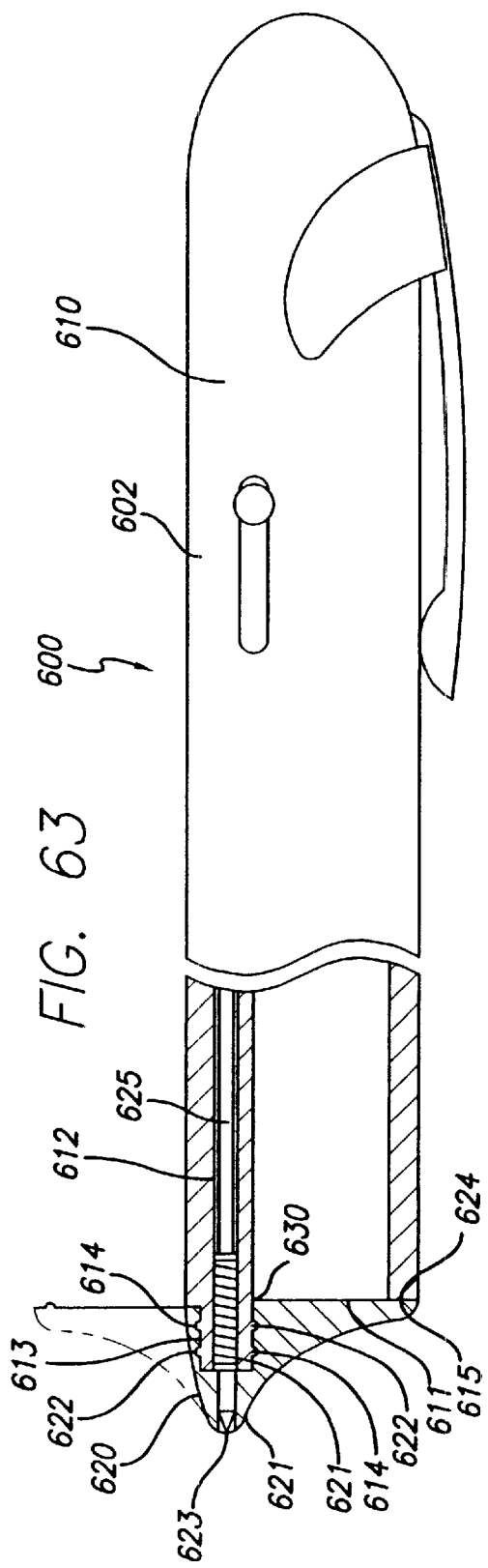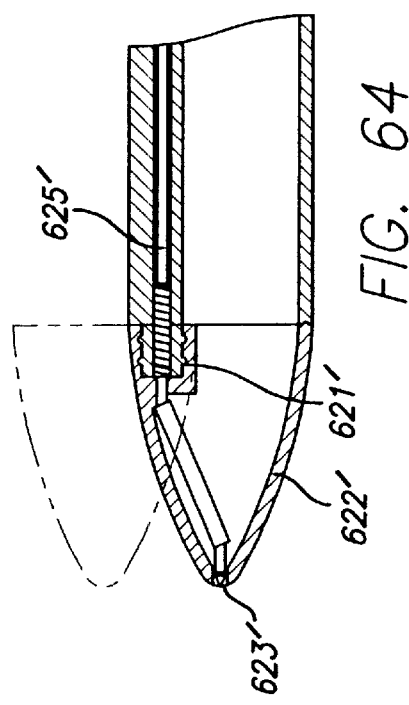

MULTI-PURPOSE CONTAINERS HAVING A FOLDABLE WRITING INSTRUMENT

RELATED APPLICATIONS

The present application is a continuation-in-part of U.S. application Ser. No. 09/607,265 filed Jun. 30, 2000, , now U.S. Pat. No. 6,270,274, and a continuation-in-part of U.S. application Ser. No. 09/625,748 filed Jul. 26, 2000, co-pending.

FIELD OF THE INVENTION

The present invention is directed to multipurpose containers in which a variety of items can be stored, such as eyeglasses writing instruments, pills, medicines, thermometers, rulers, note pads, to name a few of the nearly limitless number of items that can be stored. The containers may be provided with writing implements or gauges to measure a parameter, such as a timepiece, or a computational device, such as a calculator.

BACKGROUND OF THE INVENTION

There are numerous containers in the prior art that can be used to store items, that may or may not have another purpose associated with it, such as an attached writing instrument, or storing another item. or providing information on a prevailing aspect of the moment, such as temperature or time.

SUMMARY OF THE INVENTION

The present invention is directed to multipurpose containers and that can be used to store and retain a variety of items, including such items as eyeglasses, medicines, foods, rulers, thermometers, note pads, to name but a few of the possibilities. The containers have an interior space for storing an item, and may be provided with a second interior space for storing a second item, The container may be provided with a writing implement, or it may be provided with a gauge for measuring a parameter, or a computational device, such as a calculator. In one embodiment, the invention is a pair of folding eyeglasses that is transformable into its own compact case.

BRIEF DESCRIPTION OF THE DRAWINGS

FIGS. 1–4 show a perspective view of an embodiment of the present invention.

FIGS. 14, 15 and 16 show perspective views of another embodiment of the present invention.

FIG. 20 is an exploded view of a another embodiment of the present invention.

FIG. 21 is a perspective view of the embodiment of FIG. 20 shown in an assembled state.

FIG. 22 is an exploded view of an embodiment having variations on the FIG. 20 embodiment.

FIG. 23 is a perspective view of the embodiment of FIG. 22 shown in an assembled state.

FIG. 36 is a perspective view of an embodiment of the present invention.

FIG. 37 is a perspective view of an embodiment having variations on the FIG. 36 embodiment.

FIG. 38 is a perspective view of an embodiment having variations on the FIG. 36 embodiment.

FIGS. 39–41 show perspective views of an embodiment of the present invention.

FIGS. 43–45 show perspective views of an embodiment of the present invention.

FIGS. 57 and 58 show a perspective view on an embodiment of a writing implement of the present invention.

FIG. 59 is a fragmentary sectional view illustrating engagement of a rear cap and a barrel body of another embodiment of a pen for receiving eyeglasses according to the invention;

FIG. 63 is a sectional view of a front cap and a pen barrel of an embodiment of the invention.

FIG. 64 is a sectional view of a front cap and a pen barrel of an embodiment of the invention.

DETAILED DESCRIPTION OF THE PREFERRED EMBODIMENT

Figure 7:
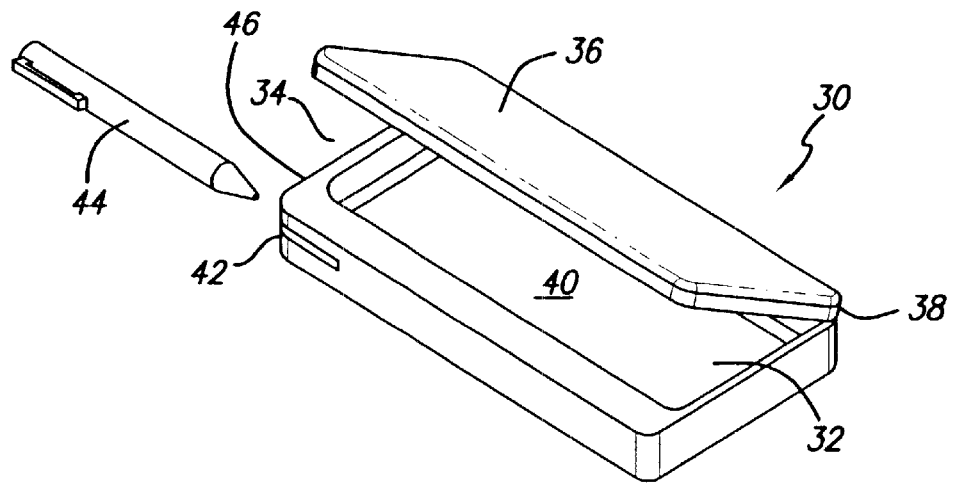
FIGS. 5, 6, and 7 show a multi-purpose container comprised of, in side-by-side arrangement.

FIG. 1 shows a writing instrument 10 that incorporates a pivotable writing implement. The writing instrument is provided with a case 12 including a first end portion 14 and a second end portion 16 that when joined define an enclosed interior space in which an item, such as a pair of eyeglasses can be placed. A writing implement 18 is attached to the first end portion. The writing implement pivotable about a hinge 20 between a writing position (FIG. 2) and a rest position (FIG. 1), in which the implement 18 is against the case. Here, a pin 21 extends through an aperture in the first end portion and the writing implement. When the first end portion is joined to the case, an enclosed interior space is defined, and when the first end portion is removed from the case the interior space can be accessed in order to remove the item from the interior space. See FIG. 3. The second end portion 16 may further be provided with an end wall 22 at the end opposite the writing implement, and the end wall may be integral with the second end portion. Additionally, a time piece may be positioned on the case, such as on the end wall 22. See FIG. 4.

To facilitate the joining of the first end portion 14 and the second end portion 16, one of the first or second end portions 14,16 may be provided with a slightly smaller outside perimeter at its opening relative to the outside perimeter of the other portion, so that it will form an interference fit with the other portion. As shown in FIG. 3, the second end portion 16 is provided with a slightly smaller perimeter 24 relative to the first end portion, but the roles can be reversed.

The writing implement at the first end portion can be a pen, pencil or any other known writing implement. While the present invention has been shown as providing an interior space for retaining glasses, it should be understood that other items may be place there, including, but not limited to, foods, medicines, thermometers, coins, notes, pocket knives, tire pressure gauges, to name only a few disparate items that evince the breadth of possibilities, which need not be exhausted here.

Figure 6:
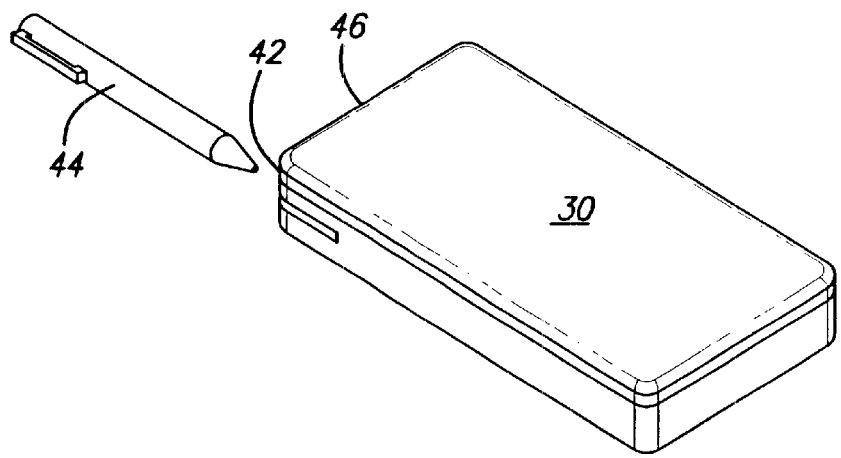
Figure 5:
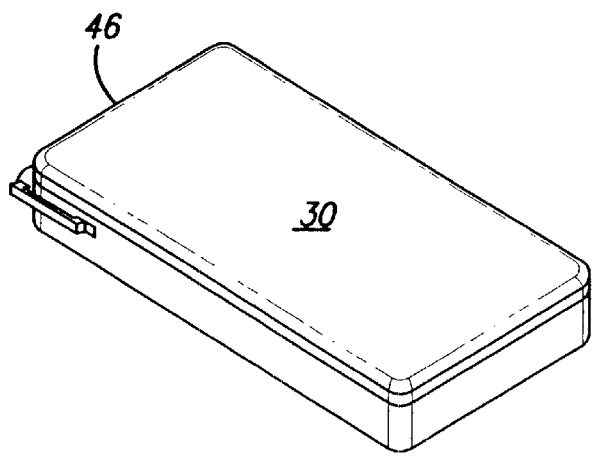

FIGS. 5, 6, and 7 show a multi-purpose container 30 having, in side-by-side arrangement, a first container portion 32 configured to receive a hand held electronic device, wherein the first container portion is provided with first half 34, a second half 36, and a hinge 38 joining the first half and the second half, the second half movable between an open position (FIG. 7) and a closed position (FIGS. 5 and 6), the first container portion 32 having an interior space 40 for receiving a hand held electronic device. The electronic device can be inserted and removed from the container portion by moving the second half between the open position and the closed position.

The multi purpose container 30 is further provided with a second container portion 42 adjacent the first container portion 32. The second container portion 42 is configured to receive a writing instrument 44, the second container portion being open on one side 46, through which the writing instrument can be inserted and removed from the second container portion.

Figure 10:
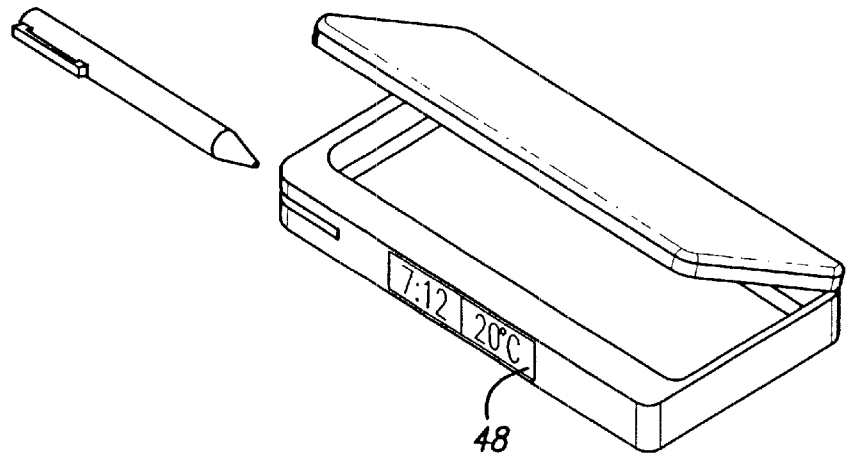
FIGS. 8, 9, and 10 show variations on the multi purpose container of FIGS. 5–7.
Figure 9:
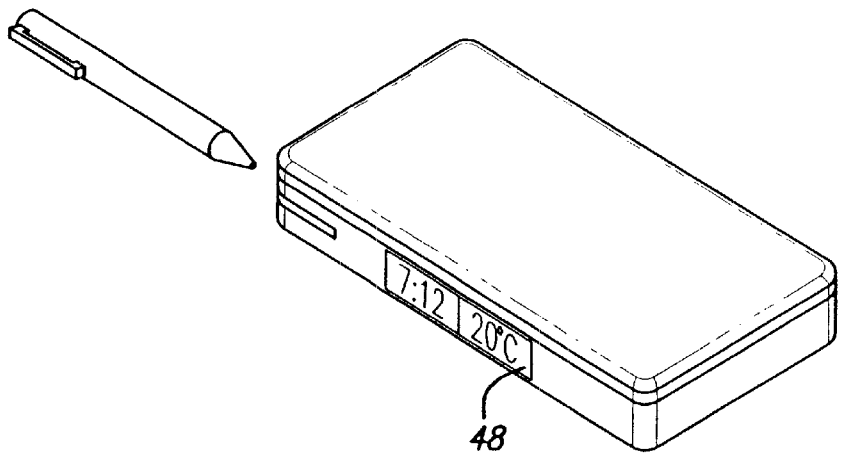
Figure 8:
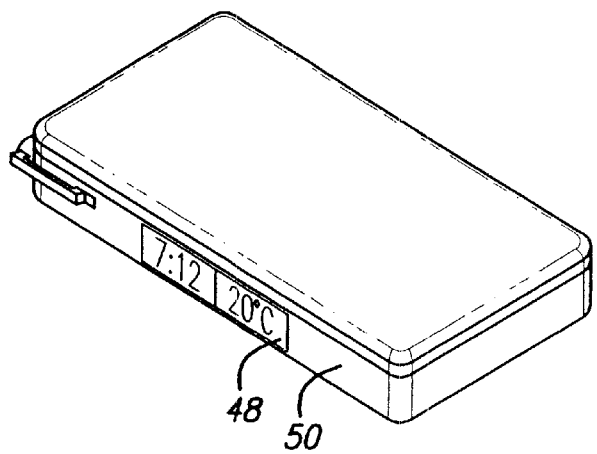

FIGS. 8, 9, and 10 show the multi purpose container 30 of FIGS. 5–7 provided with a gauge to measure a parameter, such as time, temperature, positioning, humidity, barometric pressure, to name but few possibilities. As shown in the figures, the container is provided with a digital timepiece and a thermometer 48 on its depth side 50. In another embodiment, a computational device can be included, such as a calculator.

Figure 13:
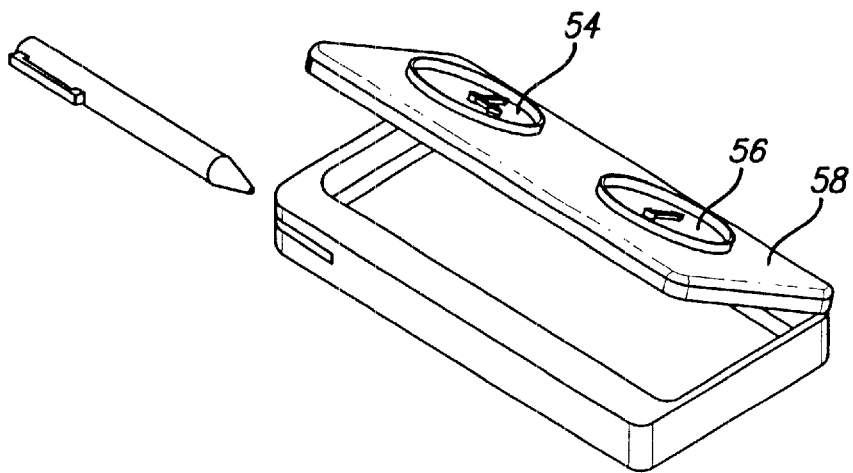
FIGS. 11, 12 and 13 show variations on the multi purpose container of FIGS. 5–7.
Figure 12:
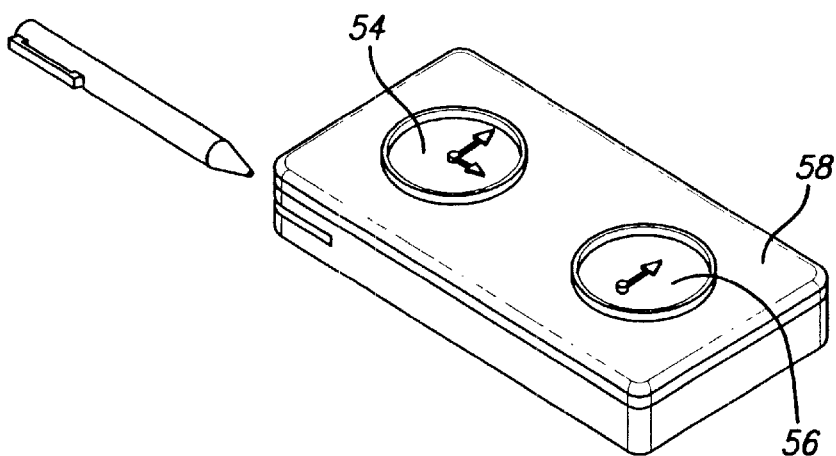
Figure 11:
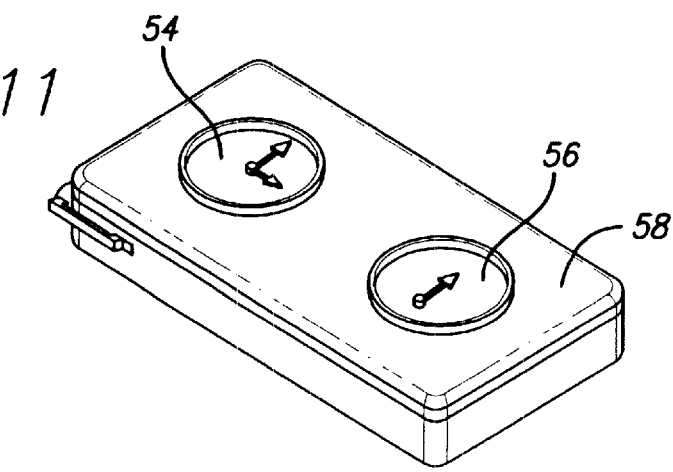

FIGS. 11, 12, and 13 show the multi purpose container 30 of FIGS. 5–7 provided with a gauge to measure a parameter, such as time, temperature, positioning, humidity, barometric pressure, to name but few possibilities. A computational device, such as a calculator, can also be employed. As shown in the figures, the container is provided with an analog timepiece 54 and a compass 56 on its top side 58

FIGS. 14, 15, and 16 show a container 60 having a first half 62 and a second half 64, the first and second halves each having hinge forming members 66 that are joined together to form a hinge 68, permitting the container to be opened and closed. The halves are constructed of a base 70 and a skirt 72 that extends around the perimeter of the base 70 in a direction perpendicular to the base. The hinge forming members 66 are located on one side of the base. When the container is in the closed position, the skirt of the first half 62 and the skirt of the second half 64 are in an abutting relationship. The hinge forming members 66 on the first and second halves 62, 64 define an open space on the inside of the hinge forming members, in which space a writing instrument, or other object sharing that configuration, can be positioned. This arrangement can be constructed by varying the diameter of one of the hinge forming members so that it fits in the other hinge forming member. The interior space between the first and second halves, hereinafter referred to as the first interior space 74, is sized and configured to retain a pair of eyeglasses, or other objects, including but not limited to notepads calendars, diaries, foods, medicines, maps, storage medium (digital or analog), to name but a few possibilities. The second interior space 76 can house an item configured like a writing instrument, including but not limited to a writing implement such as a pen, pencil, a thermometer, pressure gauge, flashlight, to name but a few possibilities.

Figure 19:
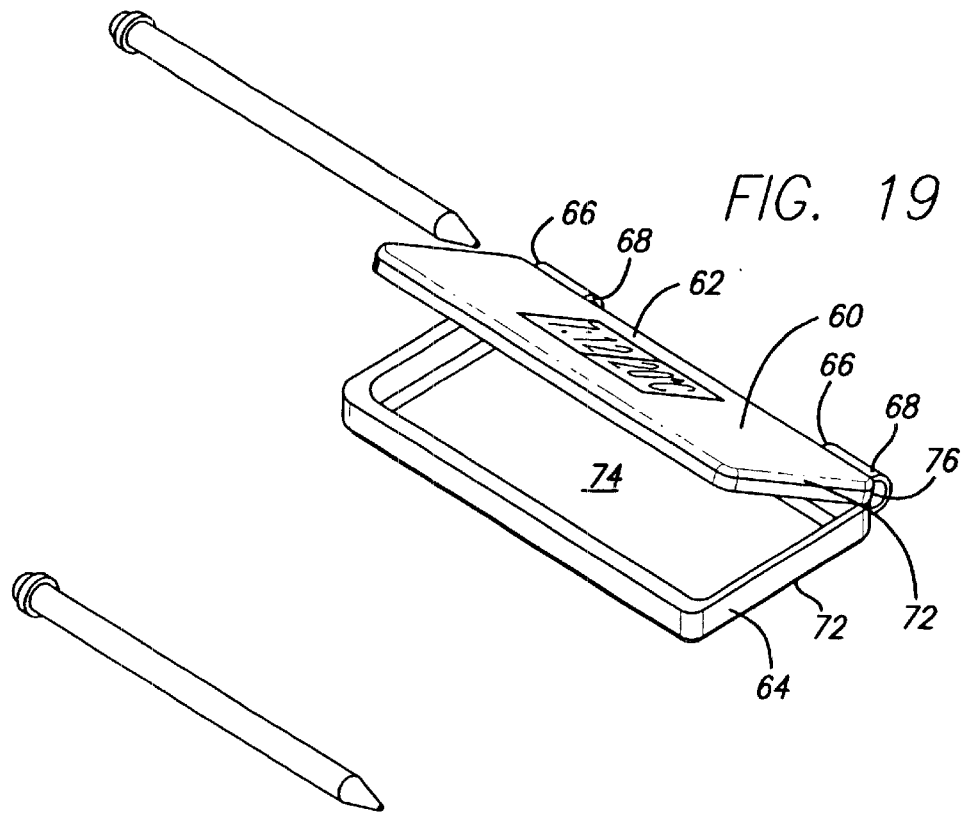
FIGS. 17, 18, and 19 show variations on the multi purpose container of FIGS. 14—16.
Figure 18:
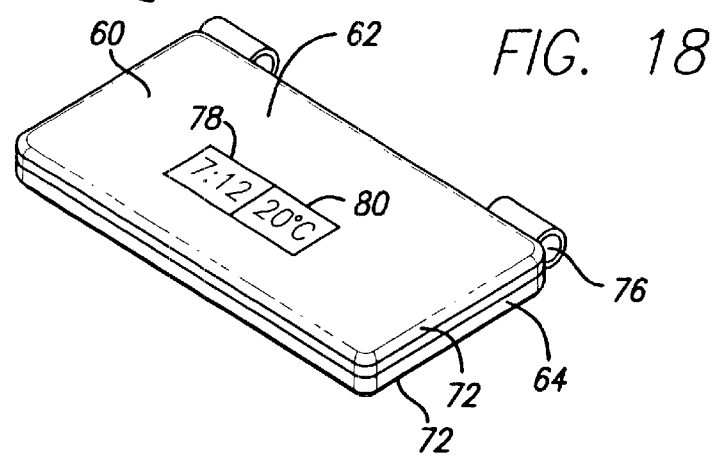
Figure 17:
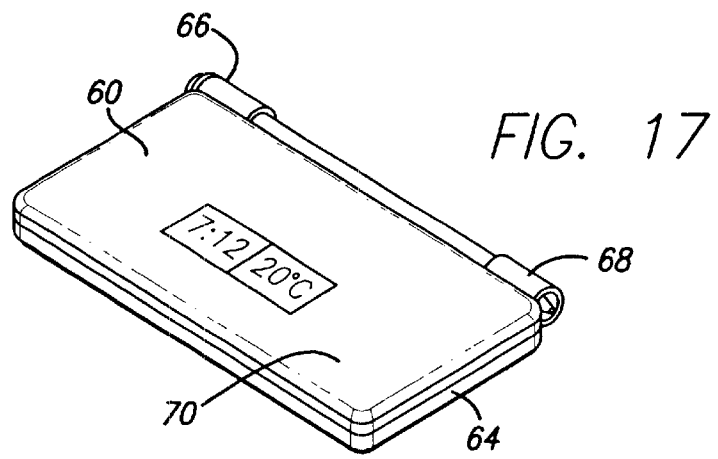

FIGS. 17, 18, and 19 show a variation on the embodiment of FIGS. 14–16 by including gauges that measure parameters. Here, the gauges 78, 80 measure time and temperature. It should be understood that any kind of gauge may be employed, including those previously noted here. A computational device may also be placed where the gauge is placed.

FIG. 20 shows an exploded view of yet another embodiment of the present invention, which is a container 82 that, when not subjected to a force sufficient to flip it or turn it, remains in an upright position, or returns thereto. The container has a housing 84 having top 86 and bottom 88 zones, the bottom zone 88 having a rounded surface 90 constituting the bottom of the container. The bottom zone 88 is heavier than the top zone. The bottom zone can be made heavier than the top zone by including a metal weight into the bottom zone 88, or by constructing the bottom zone to have a density in excess of the density of the top zone. This can be accomplished by selecting the appropriate materials to achieve this result.

When the top and bottom zones are joined together (FIG. 23), the housing defines an interior space in which at least one item can be stored. In one embodiment, the housing is provided with a top zone that is separable from the bottom zone in order to permit access to the interior space. See FIG. 22. The top zone can be provided with a conical shape. It should be understood that the top zone can be provided with a lid that can be positioned on the opening, or removed therefrom, in order to access the interior space and/or items stored therein.

Because the bottom of the container is rounded, and heavier than the remainder of the container, the container will, if not subjected to an external force, rest on its bottom, and remain in an upright position. If the container is pushed, it will wobble and then return to its upright position.

Figure 24:
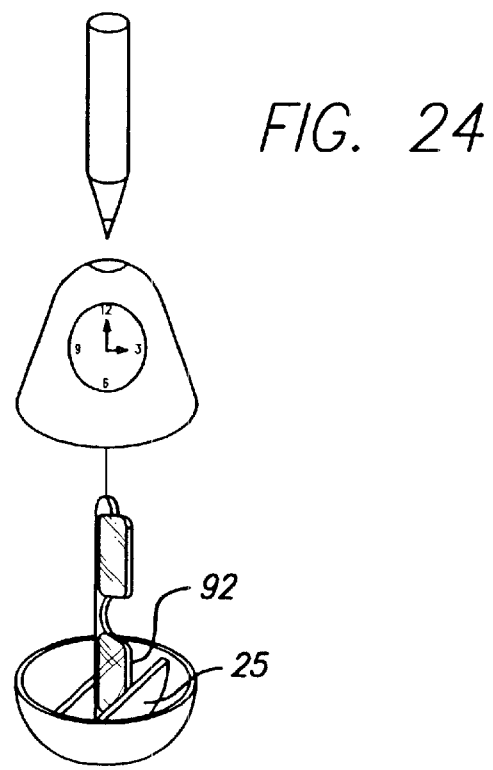
FIG. 24 is an exploded view of an embodiment having variations on the FIG. 20 embodiment.
Figure 25:
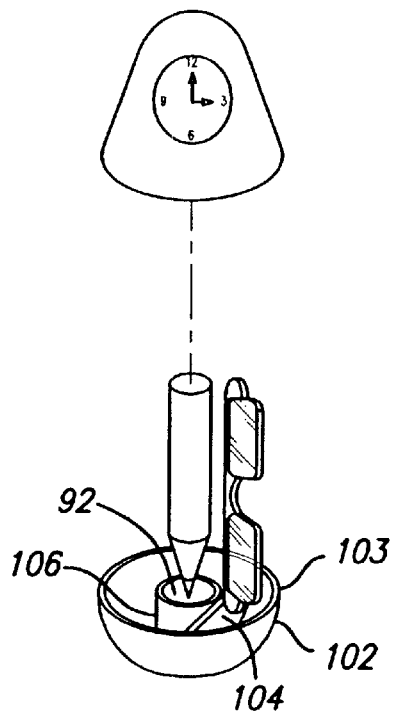
FIG. 25 is an exploded view of an embodiment having variations on the FIG. 20 embodiment.

In another embodiment, the container is provided with a gauge for measuring a parameter, such a timepiece 90, as shown in FIGS. 22–25. Alternatively, a computational device can be placed where the gauge is placed. In another embodiment, the container is provided with an opening 91 to receive a writing instrument. See FIGS. 22–24. In another embodiment, a pair of eyeglasses, or other item, can be stored in the container. See FIGS. 20–25. In another embodiment, the container is provided with compartments 92 for retaining the stored item in place. The compartment 92 may be a slot having circular sidewalls 94 that extend upward in the interior space from the bottom of the container, as shown in FIG. 24. Alternatively, the compartment 92 can be constructed out of a plurality of slot defining sidewalls 96 that extend upward in the interior space from a bottom of the container. See FIG. 24.

Figure 26:
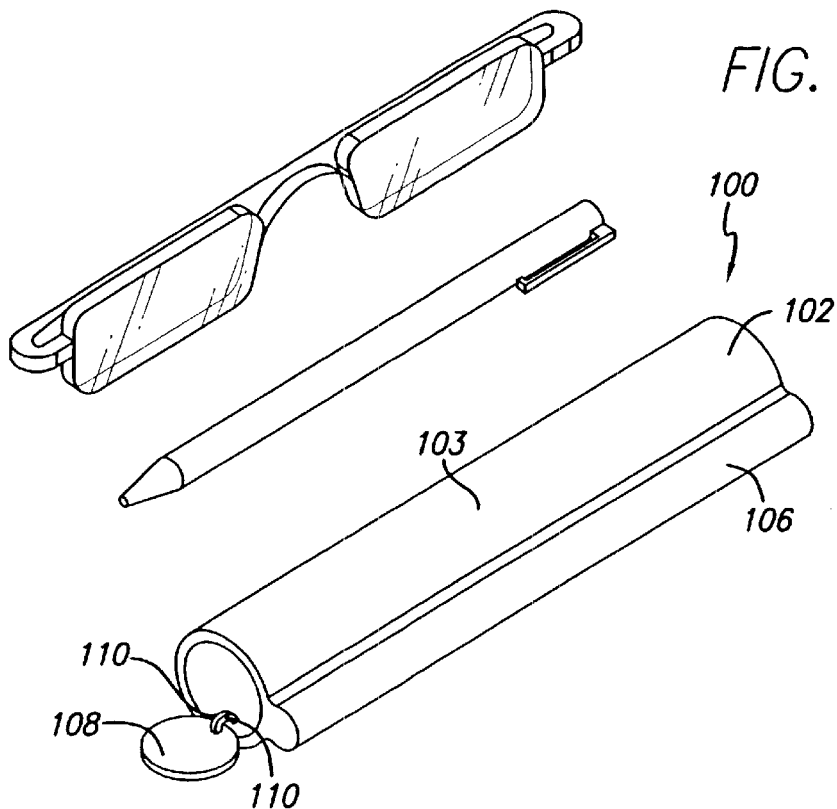
FIG. 26 is a perspective view of an embodiment of the present invention.

FIG. 26 shows a container for storing an item such as a pair of eyeglasses and a second container portion for storing an item having the configuration of a writing instrument. The container 100 has a first container portion 102 having a sidewall 103 that defines a first interior space 104. Container 100 further has a second container portion 106 defining a second interior space that can store a item having the configuration of a writing instrument, the second container portion being located on to the sidewall 103 of the first container portion 102.

The first container portion has a closure 108 attached to a hinge 110, which is mounted to the sidewall 103. The closure 108 is movable between a position closed on the container and an open position permitting access to the interior space.

Figure 27:
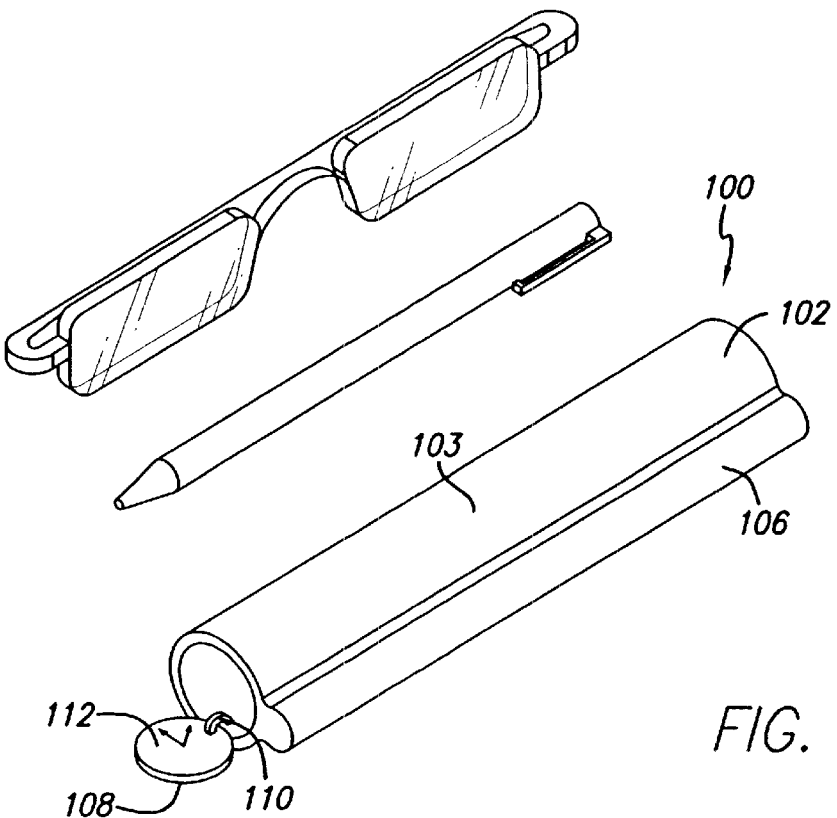
FIG. 27 is a perspective view of an embodiment having variations on the FIG. 26 embodiment.

In a variation on this embodiment shown in FIG. 27, the closure 108 is provided with a gauge 112 to measure a parameter, which in this case is a timepiece. The time piece 112 is located on the interior facing side of the closure, and so is visible when the closure is in the open position. Alternatively, a computational device can be provided.

Figure 28:
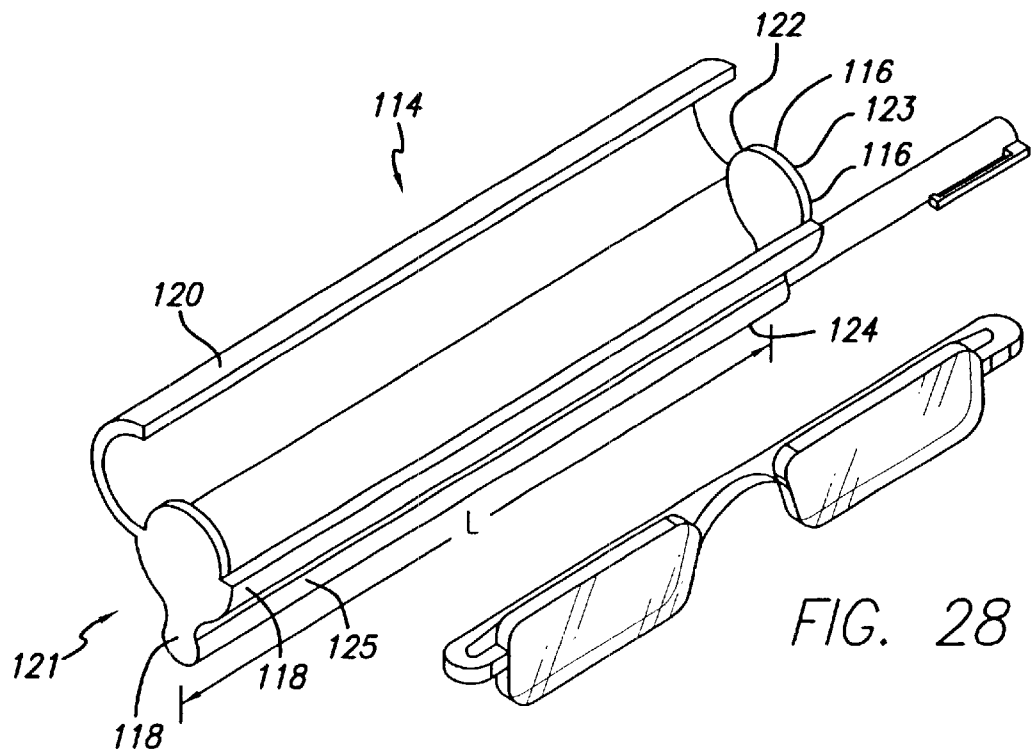
FIG. 28 shows a perspective view of an embodiment of the present invention.

FIG. 28 shows another embodiment of the present invention showing a container having first and second portions that has compartments configured to hold eyeglasses and a writing instrument. The container 114 has a first container portion 116 that is a hinged body having a length dimension L. Hinged body has two halves 118, 120 joined at a hinge 122 which extends in the length dimension. The second container portion 124 for the writing instrument is attached to one of the two halves. The hinged body is movable between a closed position and an open position along the hinge. The first hinged body has end closures 118 at a first and second ends 121, 123 of the body. When in a closed position, the body defines an interior space in which an item, such as a pair of eyeglasses, can be placed when it is in the closed position.

The second container portion 124 has a wall portion 125 that defines an interior space that can store an item configured like a writing instrument, the second container portion being joined to one of the halves of the hinged body that forms the first container portion.

Figure 29:
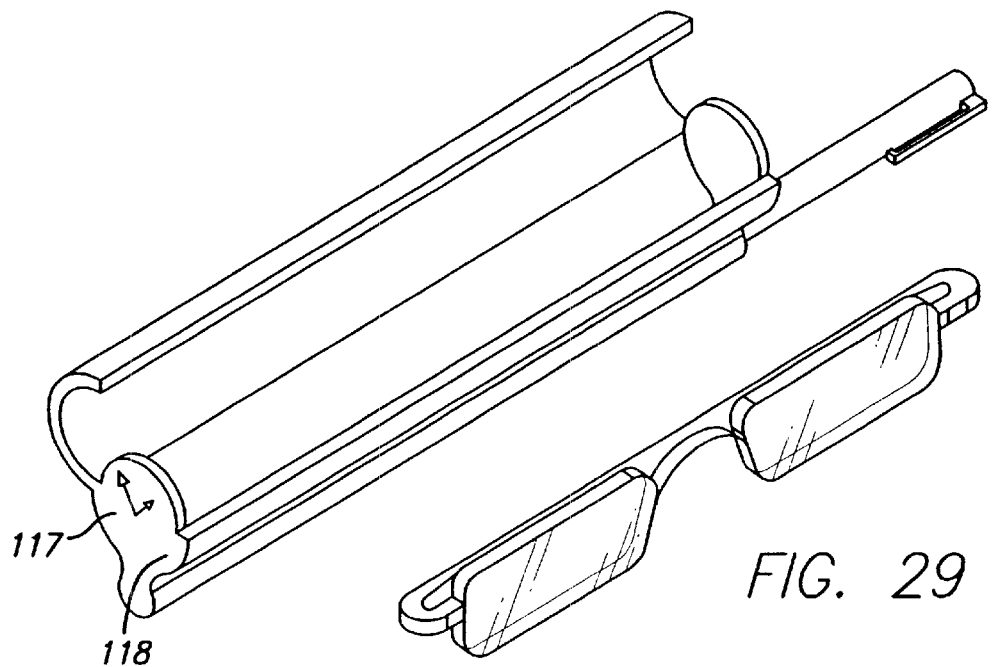
FIG. 29 is a perspective view of an embodiment having variations on the FIG. 28 embodiment.

In a variation of the embodiment shown in FIG. 28, at least one of the end closures 118 is provided with a gauge 117 for measuring a parameter. FIG. 29 shows a timepiece at one of the end closures. Alternatively, a computational device may be provided.

Figure 30:
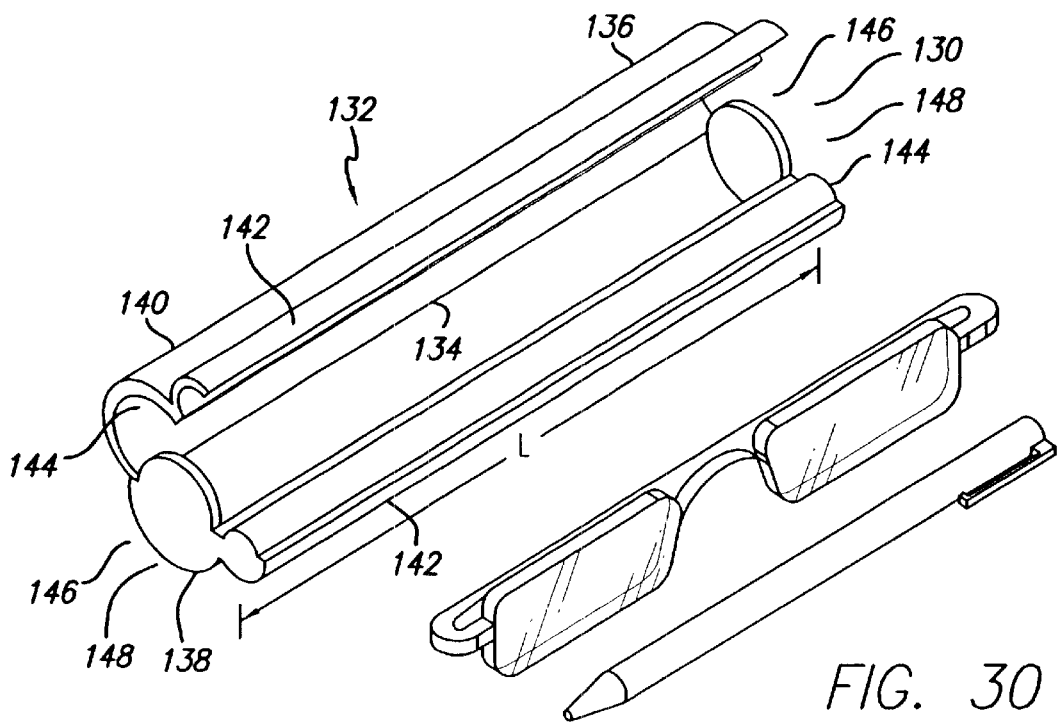
FIG. 30 shows a perspective view of an embodiment of the present invention..

FIG. 30 shows a container 130 for holding first and second container portions in an adjoining relationship. The container can hold items such as eyeglasses and writing instruments in the first and second container portions.

Container 130 is provided with a body 132 having first and second halves 136, 138 joined along a hinge 134 that extends in the length dimension L of the container. The first and second halves are movable along the hinge between a closed position and an open position.

Figure 32:
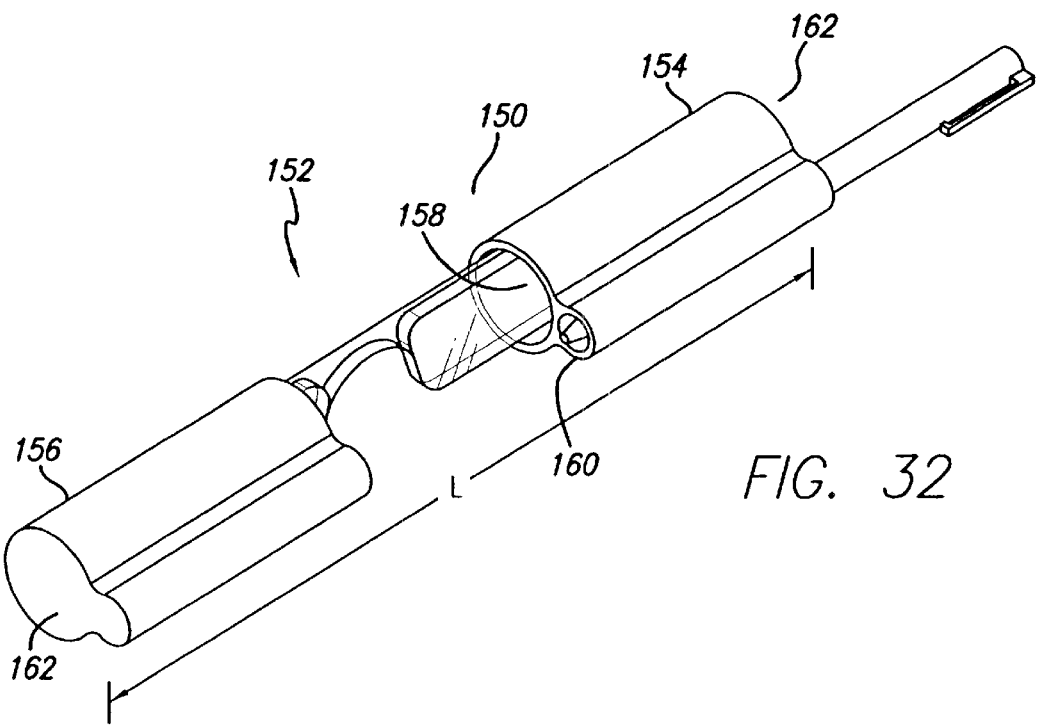
FIG. 32 shows a perspective view of an embodiment of the present invention.

Each of the halves are divided into first container forming portion 140 and a second container forming portion 142. As shown in FIG. 32, the first and second halves have sidewalls that are partitioned into the first container forming portion and second container forming portion at zone boundary 144, which is contiguous with the first and second container forming portions 140, 142.

Body 132 has end closures 146 at a first and second ends 148 of the body. When the container is in the closed position, the body has first and second interior spaces located in the first and second container portions. That is, the zone boundaries 144 of the first and second container forming portions 140, 142 enter into an adjacent relationship when the container is in the closed position.

The first container portion is configured to retain a pair of eyeglasses, but any of the other aforenoted items may be stored there. The second container portion is configured to retain a writing instrument, but any of the other aforenoted items may be stored there.

Figure 31:
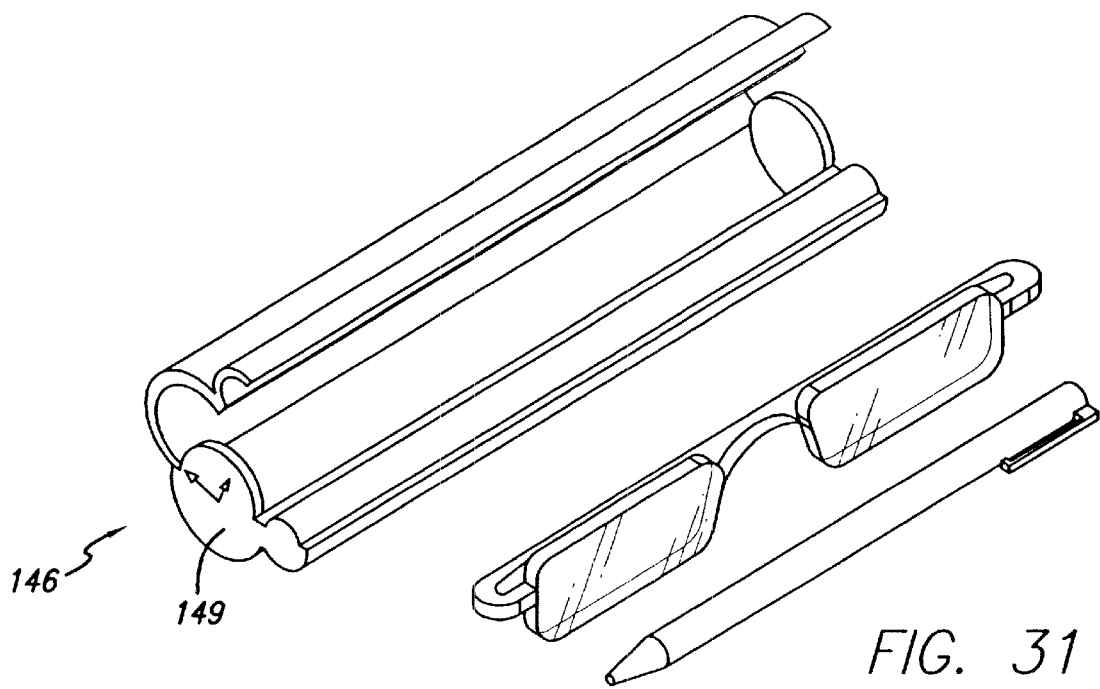
FIG. 31 is a perspective view of an embodiment having variations on the FIG. 30 embodiment.

In a variation of the embodiment shown in FIG. 30, at least one of the end closures 146 is provided with a gauge 149 for measuring a parameter. FIG. 31 shows a timepiece at one of the end closures. Alternatively, a computational device may be provided.

Figure 33:
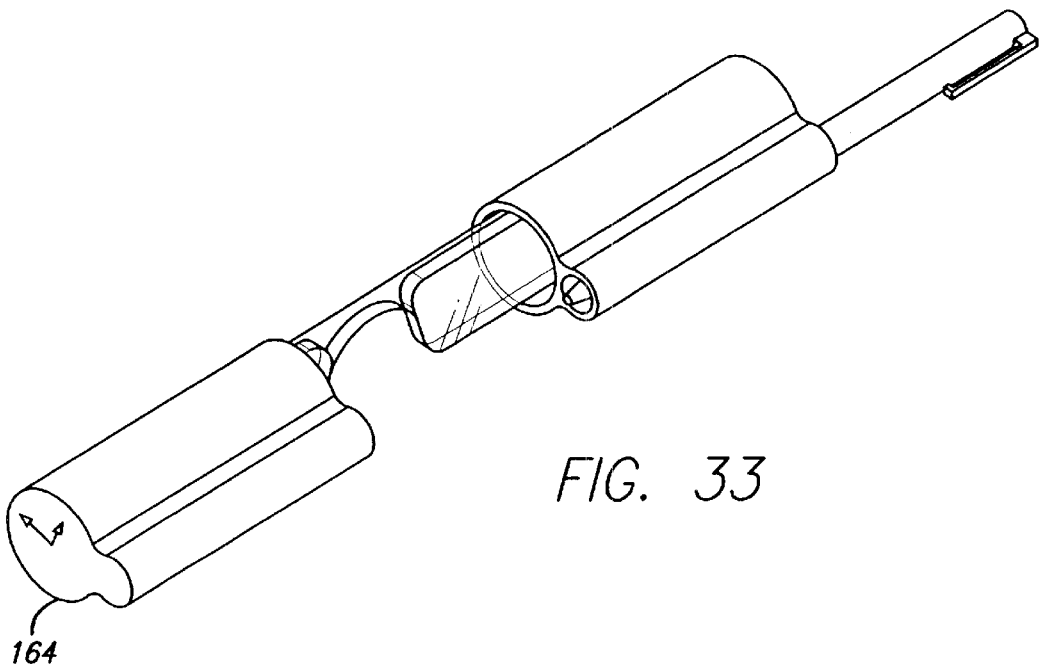
FIG. 33 is a perspective view of an embodiment having variations on the FIG. 32 embodiment.

FIGS. 32 and 33 show a container 150 comprised of a body 152 having a length dimension L that is divided in two halves 154, 156 in a direction that intersects the body. The halves can be joined together to form a closed container, or separated to provide an open container. The halves 154, 156 further have first and second container portions 158, 160 in an adjoining relationship that define first and second interior spaces for retaining items placed within the interior spaces. Thus, when the halves are joined together, items can be retained in the first and second container portions.

The first container portion 158 is configured to retain a pair of eyeglasses, but any of the other aforenoted items may be stored there. The second container portion 160 is configured to retain a writing instrument, but any of the other aforenoted items may be stored there.

In one embodiment, halves 154, 156 are about equal in length. In another embodiment, the first container portion 158 has a perimeter and the second container portion 160 is located on the perimeter. In another embodiment, the second container portion 160 is provided with an open end. In a variation of the embodiment shown in FIG. 32, at least one of the end closures 162 is provided with a gauge 164 for measuring a parameter. FIG. 33 shows a timepiece at one of the end closures. Alternatively, a computational device may be provided.

Figure 34:
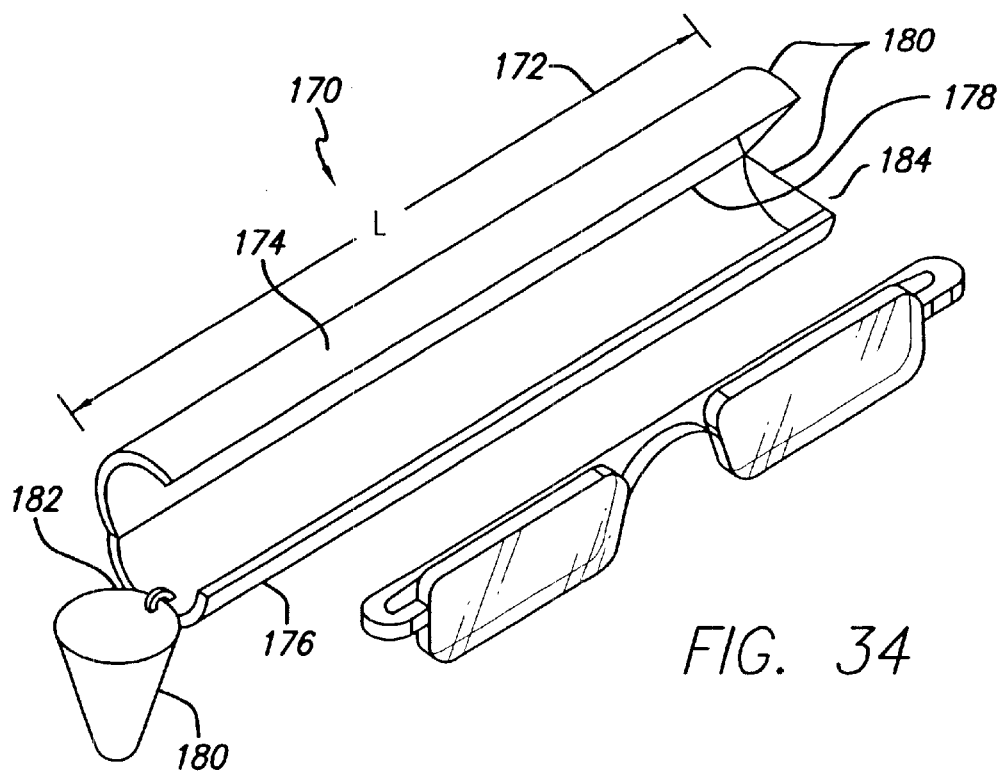
FIG. 34 is a perspective view of an embodiment of the present invention.

FIG. 34 shows a combined container and writing instrument 170 which has a hinged body 172 movable between a closed position and an open position. The hinged body 172 has a length dimension L. The hinged body 172 is constructed of two halves 174, 176 joined at the first hinge 178. Hinge 178 extends in the length dimension L. The writing implement 180 is attached to one of the two halves by second hinge 182. The writing implement 180 is movable between a writing position and an open position. The body 172 defines an interior space in which an item can be placed when the body is in the closed position. The interior space is configured to retain a pair of eyeglasses, or another item, including those previously mentioned, in the interior space.

Figure 35:
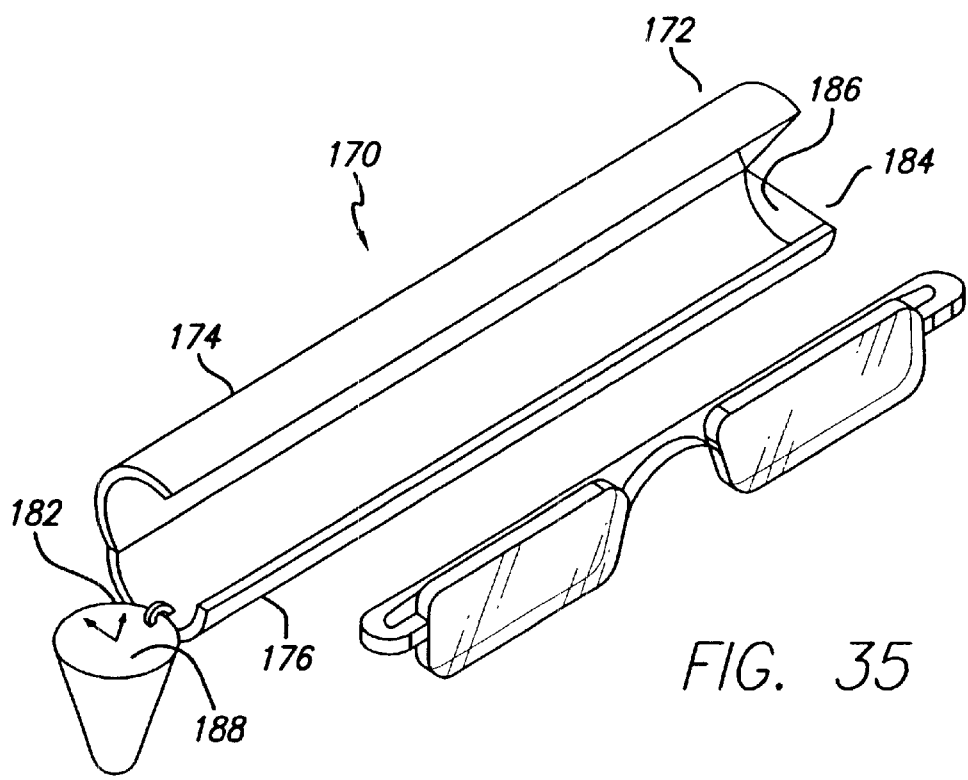
FIG. 35 is a perspective view of an embodiment having variations on the FIG. 34 embodiment.

In another embodiment, the body is provided with a second end closure 184, which can be of a pair of semicircles 186, each of which is attached to one of the halves. In another embodiment, the writing implement is provided with a gauge 188, such as a timepiece that is positioned to be visible when the writing implement is in the open position. That is, the writing implement is provided with a timepiece, or other gauge to measure a parameter, on its rear side. See FIG. 35. Alternatively, a computational device may be provided.

FIGS. 36–38 show a writing instrument 190 having a body 192 that defines an interior space in which an item, such as a pair of eyeglasses, or any other item, including those previously noted, can be placed. A writing implement 194 is positioned at the a first end 196 of the body 192, and is attached to the body 192 by a hinge 198. The writing implement is pivotable 194 between a writing position and an open position allowing for access to the container. In one embodiment, a gauge 200 to measure a parameter is attached to the end of the container. The gauge can be a timepiece, or any of the other gauges previously described. Alternatively, a computational device may be provided.

In an another embodiment shown in FIG. 37, the gauge 200 is positioned on the inward facing side of the writing implement 194. In yet another embodiment shown in FIG. 38, the writing implement is positioned on an end closure 202 on the end opposite the writing implement 194. The end closure is attached to the body by a hinge 204. Alternatively, a computational device may be provided.

It should be understood that embodiments combining features shown in FIGS. 32, 33 and 34–38 are possible. For example, the container can be provided with a body 152 having a length dimension L that is divided in two halves 154, 156 in a direction that intersects the body. The halves can be joined together to form a closed container, or separated to provide an open container. The container can also be provided with a writing implement positioned at the a first end of the body, and attached to the body by a hinge. The writing implement is pivotable between a writing position and an open position providing access to the container. In another embodiment, a gauge 200 to measure a parameter is attached to the end of the container, facing inward or outward, as previously described. The gauge can be a timepiece, or any of the other gauges previously described. Alternatively, a computational device may be provided.

FIGS. 39–41 show a writing instrument 210 having an off-axis writing implement 212 and removable first end 214 that allows for access to an interior space in which items can be stored. The writing instrument 210 is provided with a barrel 216 having an axis extending in the length direction L of the writing instrument. The barrel sidewalls 218 define an interior space for retaining and storing an item.

The writing implement is positioned off of the axis of the barrel, that is, it may be parallel to, but not the axis. At the first end of the barrel, an opening 220 is provided in the first end 214 in communication with the interior space.

A removable first end 214 is adapted to seal the opening 220 when it is placed on the first end of the barrel 216. The removable first end 214 can be removed from the barrel 216 to permit access to the opening 220, and the interior space. As shown in FIGS. 39–41, the removable first end 214 may be a cap 215 having a base 222 and a skirt 224 attached to the base 222 that, when joined to the barrel 216, seals the opening 220 from the exterior environment and encloses the writing implement 212 within the cap.

The interior space is configured to hold a pair of eyeglasses, or any of the other items previously mentioned.

Figure 42:
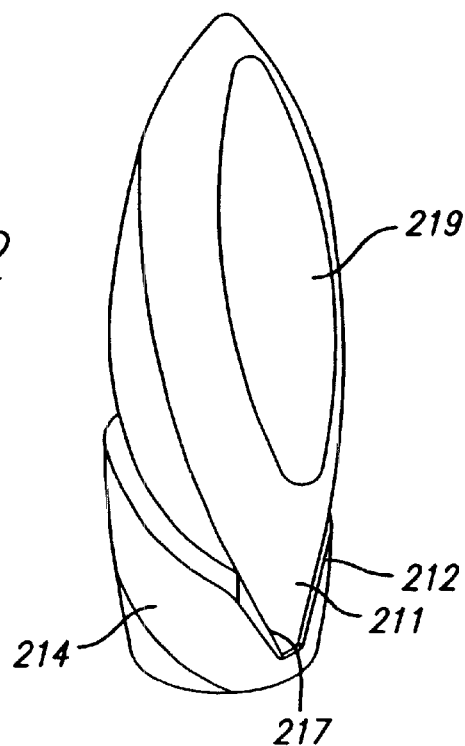
FIG. 42 shows a perspective view of an embodiment of the present invention.
Figure 65:
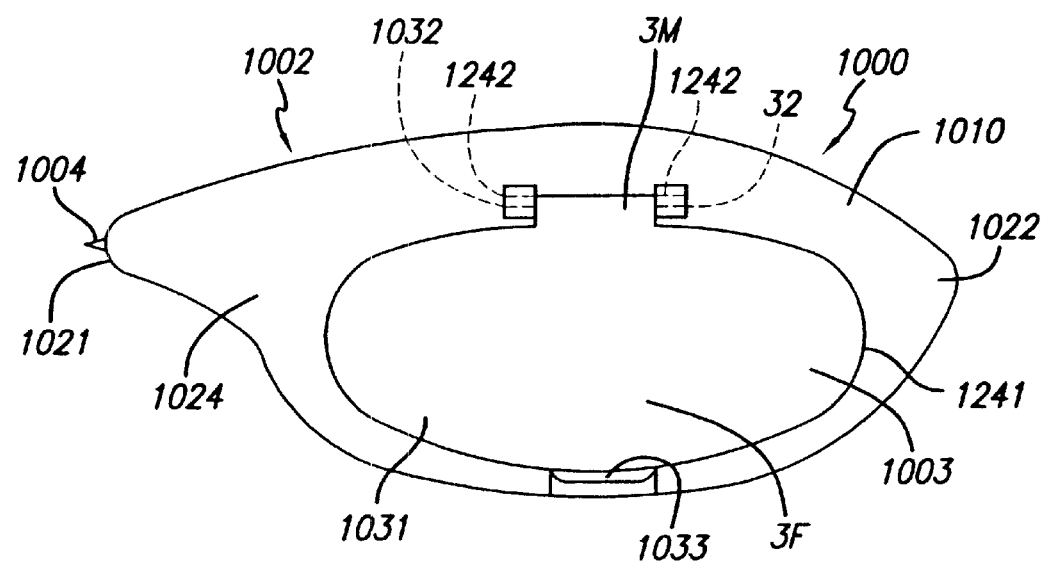
FIG. 65 is a schematic top view of an embodiment of a pen for receiving eyeglasses according to the invention.

In an alternative embodiment shown in FIG. 42, the removable first end 214 is a plug received over the opening, or within the opening. The tip 211 of the writing implement 212 is received within a recess 217 in the removable first end 214 when it is positioned within or over the opening.

FIG. 42 shows a writing instrument that is provided with a mirror 219. The mirror may be positioned near the tip 211 of the writing implement 212, or the mirror may cover the predominant portion of a barrel side. Although FIG. 42 shows a first end having a fingernail shaped housing in which the writing implement 212 is positioned, it should be understood that the other configurations are possible.

In yet a further embodiment of the invention, a gauge for measuring a parameter, such as a timepiece 228, is provided on one of the ends of the writing instrument. It can be provided on the removable first end 214 (FIGS. 39, 40) or the second end 225 (FIG. 41). Alternatively, a computational device may be provided.

FIGS. 43, 44, and 45 show a variation on the embodiments of FIGS. 39, 40, and 41 wherein the predominant portion of interior space is associated with the removable first end 214. In FIGS. 39, 40, and 41, the predominant portion of the interior space is associated with the barrel 216.

Figure 46:
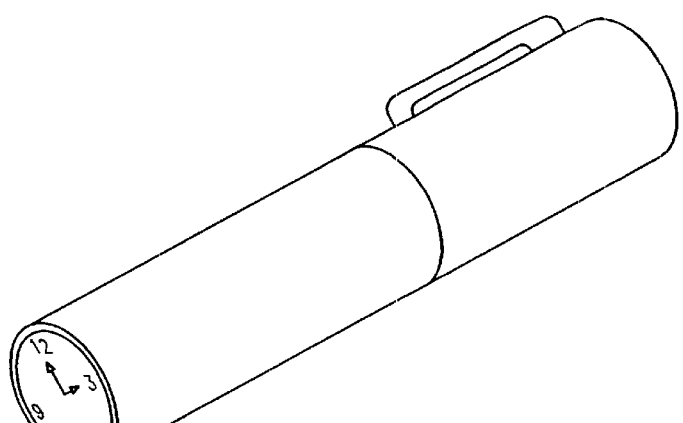
FIGS. 46–48 show perspective views of an embodiment of the present invention.
Figure 47:
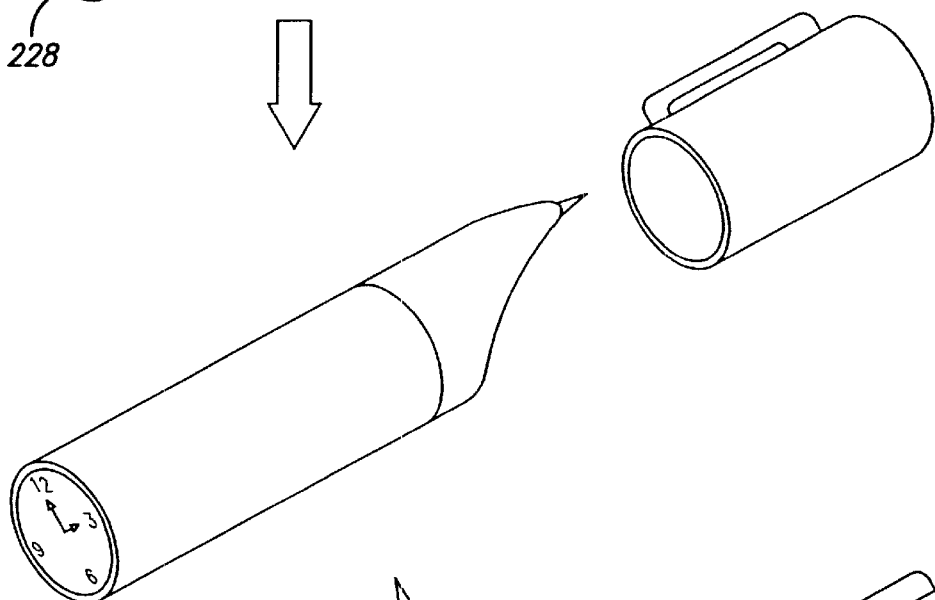
Figure 48:
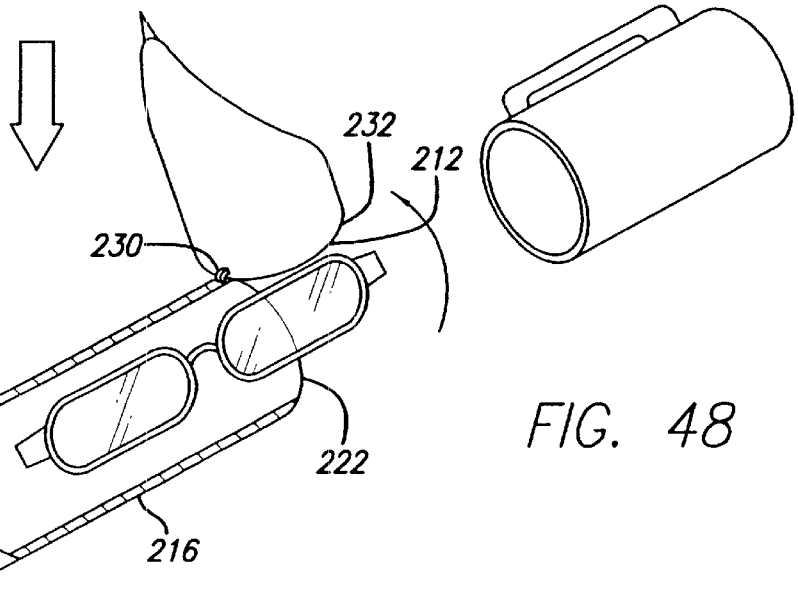

In yet a further embodiment, shown in FIGS. 46, 47, and 48, the writing implement 212 is attached to the barrel 216 by a hinge 230. The writing implement 212 is movable from an open position to a closed position. The writing implement 212 has a rear surface 232 that seals the opening 222 of the barrel when the writing implement is in the closed position.

Figure 49:
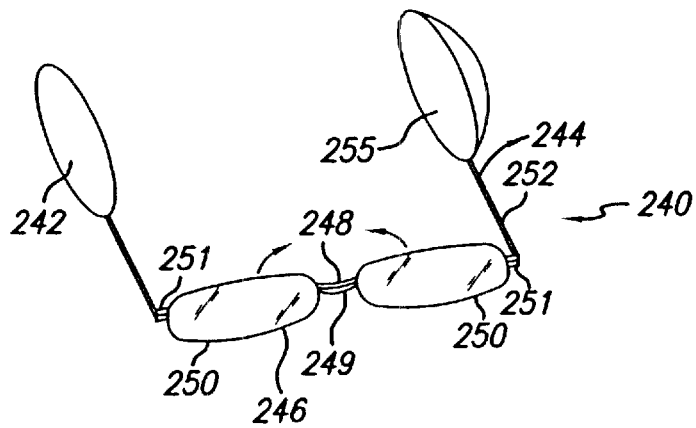
Figure 50:
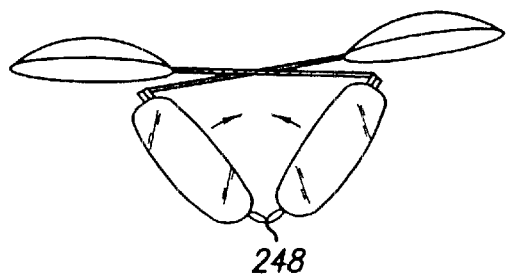

FIG. 49 shows a folding eyeglass frame 240 in which the glasses, when in the open position (FIG. 49) are configured to be worn in the conventional manner, and a closed position (FIG. 54) in which the lenses and all or a substantial portion of the frame are enclosed within clam shell like portions 242 of the frame 240 that serve as the ear rest portions of the arms 244. When in the folded the state, it is not apparent that the resulting object, which resembles a clam, contains a pair of glasses. The compact form the glasses take, when folded, provides apparent space saving benefits.

Figure 52:
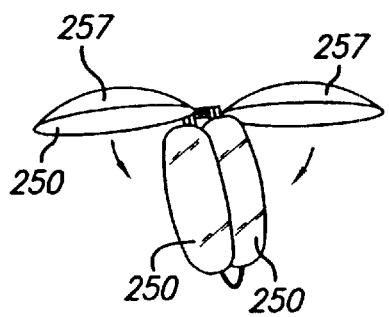
Figure 53:
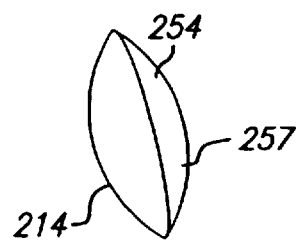
FIGS. 59–53 show perspective views of an embodiment of the present invention.
Figure 54:
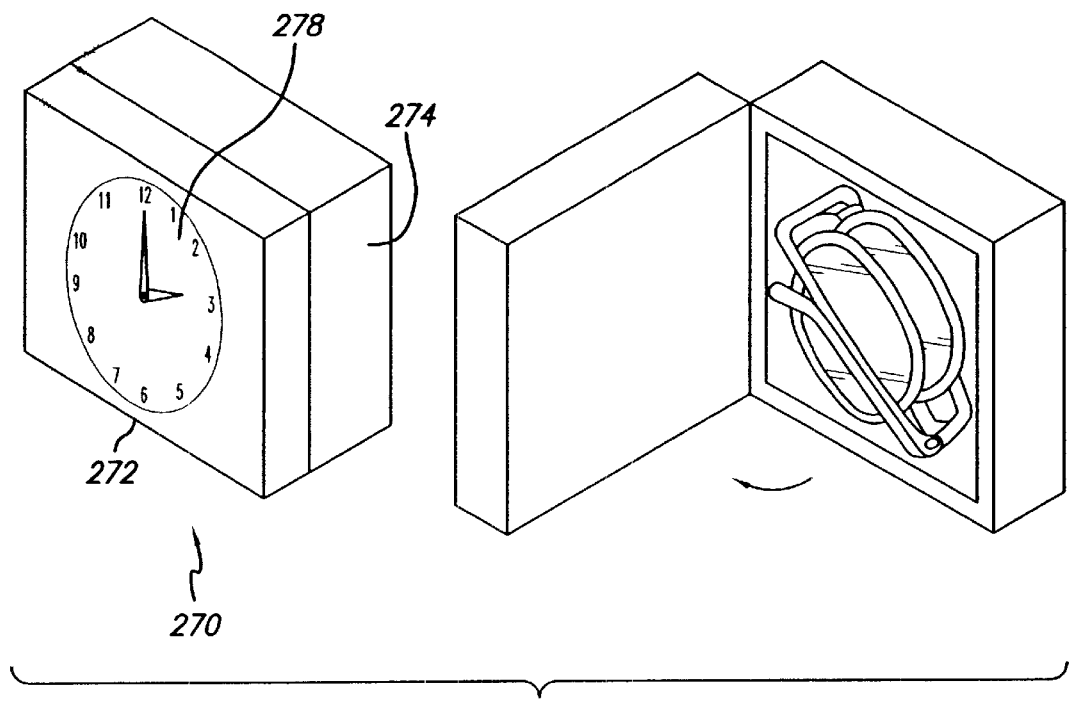
FIGS. 54–56 show perspective views of an embodiment of the present invention.

The glasses are provided with a front frame 246 including a pair of lens retaining portions joined together by a hinged bridge 248. The hinged bridge is constructed of two hinge forming members 249, each of which extends from the inward side of the lens retaining members 250. The hinge forming members are provided with apertures which are placed in alignment with each other and joined together by a screw, pin, bolt, or other known devices for joining a hinge. The glasses can be folded along the hinge, as shown in FIGS. 52–54.

Arms 244 are attached to the outward sides of the lens retaining members 250 at hinges 251 in same manner as described with respect to the joining the hinge forming members at the bridge. The hinged arms can be moved out ward, in a configuration in which the glasses can be worn by the user, or moved inwardly, towards the lens retaining members.

The arms are constructed of a first relatively thin portion 252 that extends from the hinges 251. Concave shaped ear rests 254 are slidably mounted over the relatively thin portions 252. The concave shaped ear rests 254 have an open face 255 in the direction of the user's head.

Figure 51:
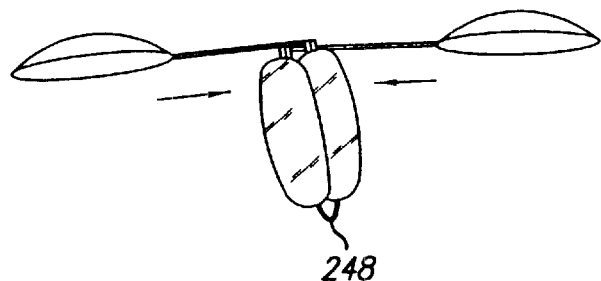

After wearing the glasses, the user can fold them into a compact, space saving form, more easily stored than the unfolded form. The user slides the ear rests forward over the relatively thin portions of the arm (FIG. 51), folds the glasses inward at the hinges 251 so that the lens retaining members approach each other and eventually abut each other (FIG. 52), and then folds the concave shaped ear rests 254 over the lens retaining members on the other side of the glasses (FIGS. 53 and 54). In this folded state, the edges 257 of the ear rests 254 abut each other, and the lens retaining members and other portions of the frame are enclosed within the ear rests.

Figure 55:
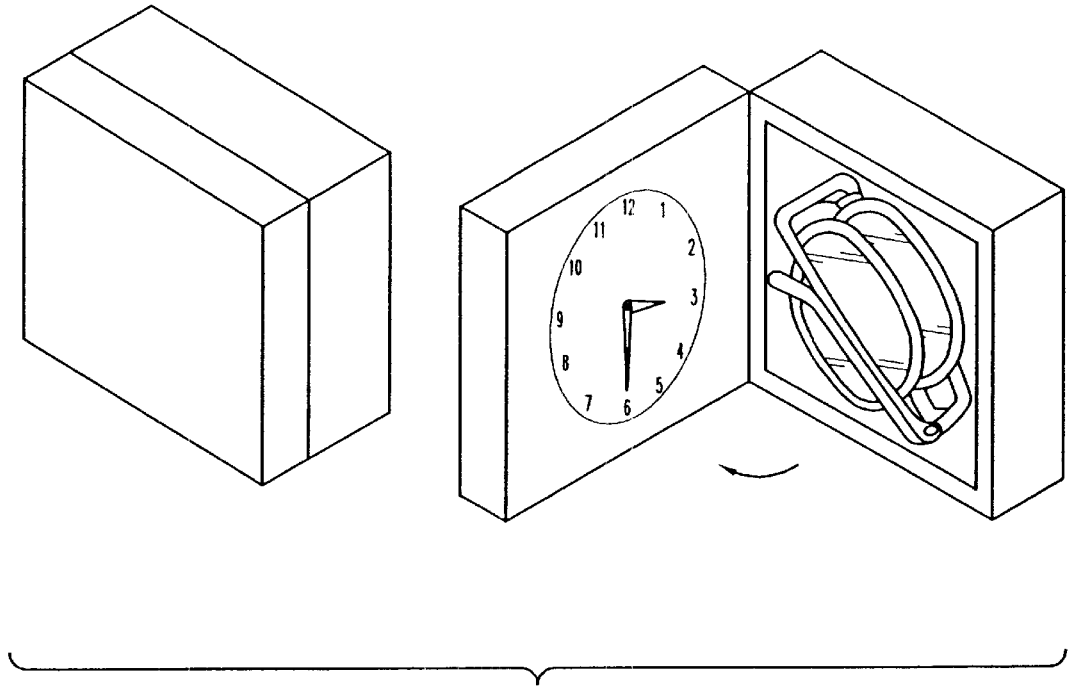

FIG. 55 shows a container 270 for storing folding eyeglasses in a container that is provided with a cover portion 272, a base portion 274, and a gauge 278 for measuring a parameter, such as a timepiece or any of the others previously noted. Alternatively, a computational device may be provided. The gauge is positioned on the face of the cover portion 272. The cover portion 272 is attached to the base portion by a hinge 276. An item, such as a pair of folding eyeglasses, can be stored in the interior container space, and enclosed there when the cover is closed. Any of the other previously mentioned items can be stored there.

Figure 56:
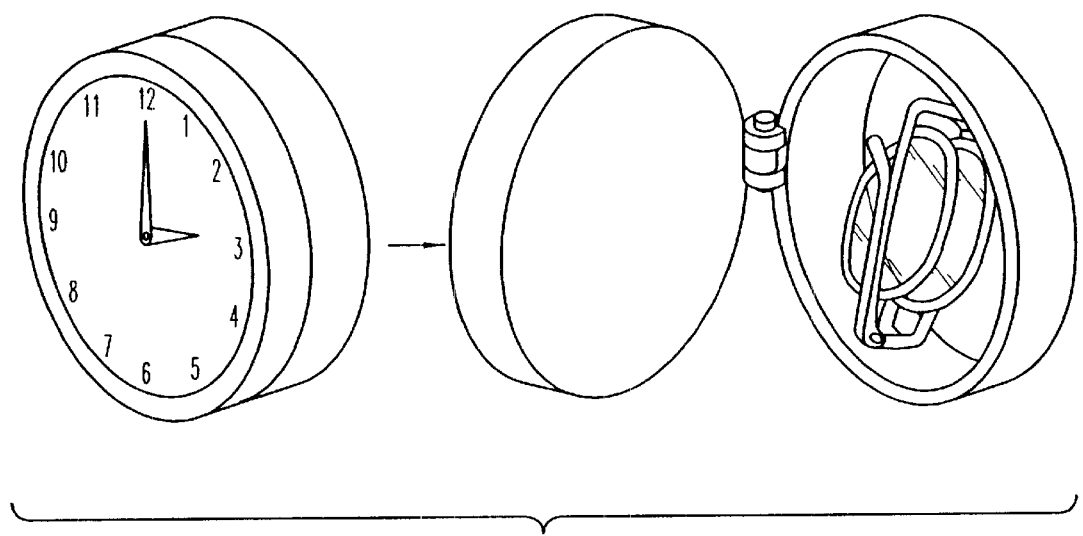

FIG. 56 shows a variation on the previous embodiment. Here, the timepiece 278 is positioned on the interior face 272 of the cover, and is visible only when the cover is in the open position.

The container can take any known shape. Exemplary are the square and rounded shapes shown in FIGS. 55, 56, and 57.

Figure 59:
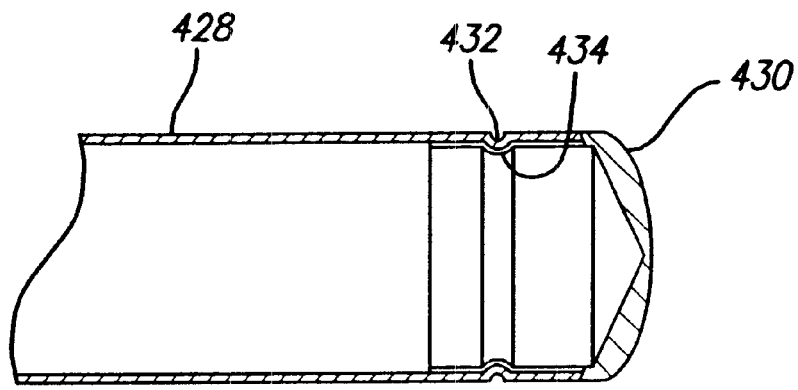

FIGS. 58 and 59 show a suitable writing implement 400 that can be used in several of the embodiments described herein. The writing implement includes and openable front cap and writing tip 402. The front cap includes a hollow rotary knob 404 and connecting element 406 that may be used to close an end of the container or barrel. The rotary knob 404 and connecting element 406 are interengaged so that the rotary knob can rotate relative to the connecting element 406. The connecting element 406 has a front end formed with a cylindrical tip mounting portion 408. The tip mounting portion 408 has an inner surface formed with two opposed substantially trapezoidal projections 410 such that two substantially trapezoidal recesses 412 are defined between the projections 410. Each projection 410 has a front end surface formned with a limiting depressed portion 414. The writing tip 402 has a front end portion fitted with a spring 416 for biasing the writing tip 402 to a retracted position, that is, retracted within the rotary knob 404. Further, the writing tip 402 has a rear end portion provided with two opposed, substantially triangular abutting protrusions 418 that fit into recesses 410. The connecting element 406 can be press fitted within the opening in the barrel or container. Rotation of the rotary knob 404 relative to the barrel or container against the biasing action of the spring, the writing tip 402 will rotate relative to the connecting element 406, while the abutting protrusions 418 are confined by the limiting depressed portions 414. At this time, the writing tip 402 will extend from a front end of the rotary knob 404, which is the write position. The rotary knob may be turned at any time to cause the abutting protrusions 418 to displace to the recesses 412 by virtue of the biasing action of the spring 416 so that the writing tip 402 retracts into the rotary knob 404.

When it is desired to stow the eyeglasses in the pen barrel 422 of the pen 424, it is only necessary to remove the writing tip unit 400 from the pen barrel 422 to allow insertion of the eyeglasses 420 via the front end 426 into the barrel body 428. As such, the user may carry the pen around with the eyeglasses stowed thereinside, and may remove the eyeglasses stowed thereinside, and may remove the eyeglasses from the pen in a convenient manner any time.

Referring to FIG. 59, in another embodiment, an outer surface of the rear cap 430 is formed with an annular groove 432. The barrel body 428 is sleeved on the rear cap 430, and has an inner surface formed with an annular projection 434 that engages fittingly the annular groove 432 in the rear cap 430, thereby retaining the rear cap 430 on the barrel body 428.

Figure 60:
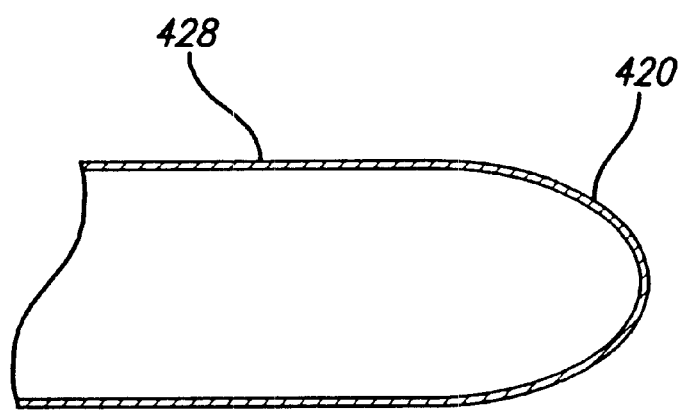
FIG. 60 is a side view of the rear end of another embodiment of the present invention.

With reference to FIG. 60, in another embodiment, the rear cap 430 may be formed integrally with the barrel body 428.

Figure 61:
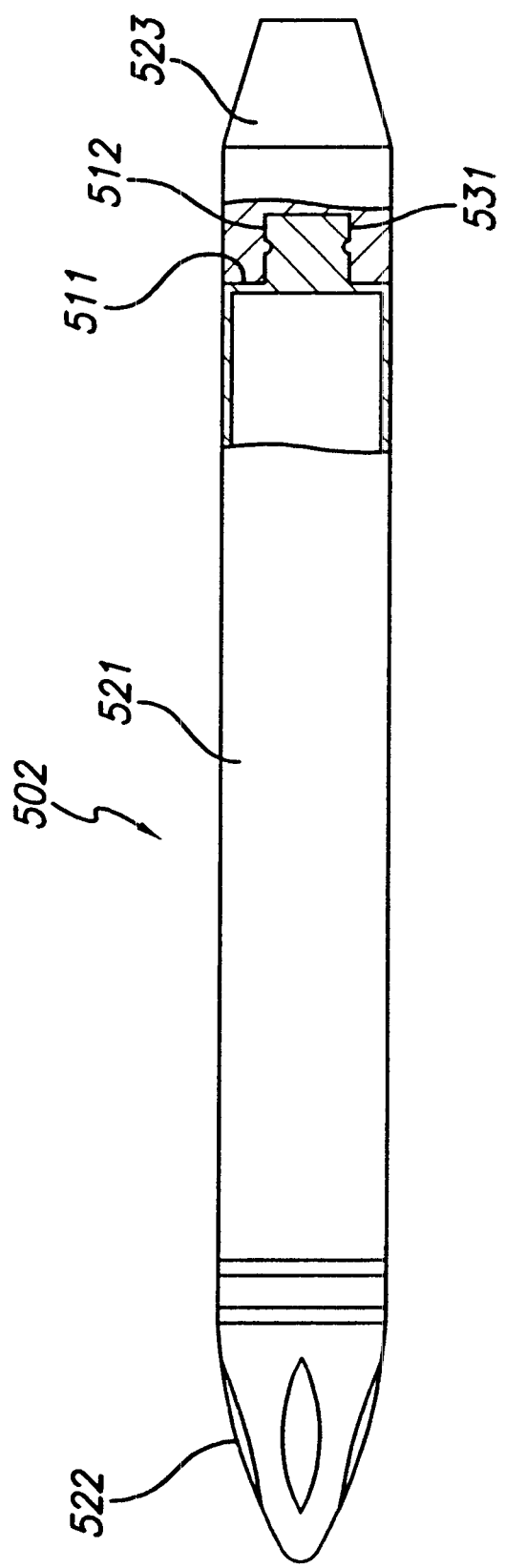
FIG. 61 is a partly sectional view of the of embodiment of a pen for receiving eyeglasses according to the invention.

Referring to FIG. 61, another embodiment of a pen 502 according to the present invention is shown to include a pen barrel 21 and a writing tip unit 522. A fixed rear cap 511 is mounted fixedly on and closes a rear end of the pen barrel 521. This embodiment is different from the a previous embodiment in that a rear end of the rear cap 511 extends rearwardly to form a retaining block 512, and a flashlight 523 is mounted fixedly on the retaining block 512 in such a manner that the retaining block 212 is press fitted withing a blind hole 531 in the flashlight 523. Hence, the pen 502 may have an additional lighting function. It should be appreciated that since the flashlight 523 is provided on the rear cap 511 that is mounted fixedly on the rear end of the pen barrel 502, the structure of the pen 502 is relatively strong.

Figure 62:
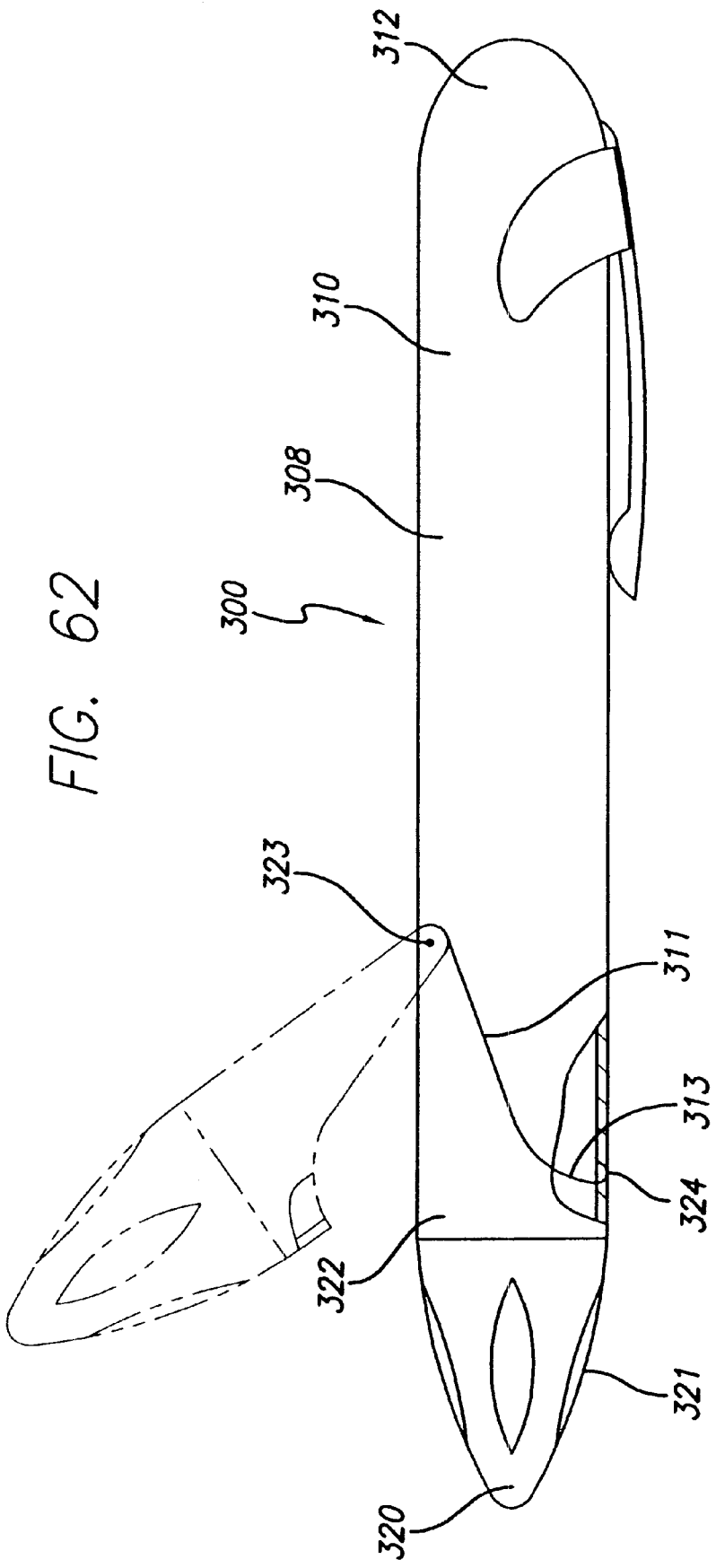
FIG. 62 is a sectional view of an embodiment of a pen for receiving eyeglasses according to the invention.

Referring to FIG. 62, another embodiment of a pen 300 according to the present invention is shown to include a pen barrel 308 and a writing tip unit 320. Likewise, the writing tip unit 320 includes an openable front cap constituted by a rotary knob 321 and a connecting block 322, and a writing tip (not shown). The pen barrel 308 has a barrel body 310 with an open front end 311 and a rear cap 312 integrally formed with the barrel body 310. This embodiment is different from the first preferred embodiment in that the writing tip unit 320 is formed with a retaining edge 324, whereas the pen barrel 308 is formed with a retaining edge 324, whereas the pen barrel 308 is formed with a retaining edge 313 that engages the retaining edge 324 of the writing tip unit 320, thereby positioning the writing tip unit 320 on the pen barrel 308. In addition, the writing tip unit 320 is mounted rotatably on the pen barrel 308 via a pivot portion 323 and is rotatable about an axis, which is perpendicular to the barrel body 310, for opening and closing the front end 311 of the barrel body 310. In this embodiment, since the writing tip unit 320 is mounted pivotally on the pen barrel 308, it remains attached to the pen barrel 308, it remains attached to the pen barrel 308 when lifted to permit access to the interior of the barrel body 310.

With reference to FIG. 63, another embodiment of a pen 600 according to the present invention is shown to include a pen barrel 602 with a barrel body 610 and an open front end 611, and an openable front cap 620. This embodiment differs from the fifth preferred embodiment in that the front cap 620 has a rear end surface with an outer peripheral portion formed with a pivot hole 621, and an inner surface formed with tow parallel annular grooves 622 in communication with the pivot hole 621. The barrel body 610 has a front end surface which includes an axially extending pivot pin 630 that extends integrally and forwardly therefrom, and that engages fittingly the pivot hole 630 in the front cap 620. The pivot pin 613 has an outer surface formed with two annular projections 614 that engage respectively and fittingly the annular grooves 622 in the front cap 620, whereby the front cap 620 can rotate about the pivot pin 613 along an axis that is parallel to the barrel body 610 for opening and closing of the front end 611 of the barrel body 610. In order to secure the front cap 620 on the front end 611 of the barrel body 610, the front cap 620 on the front end 611 of the barrel body 610, the front cap 620 on the front end 611 of the barrel body 610, the front cap 620 is provided with a boss 624 projecting therefrom and distal to the pivot pin hole 621, and the front end 611 of the pen barrel 602 is provided with an indentation 615 for engaging the boss 624 when the front cap 620 on the front end 611 of the barrel body 610, the front cap 620 is rotated to a closed position. In addition, and axially extending cylindrical hole 612 is formed in the barrel body 610 to extend through the pivot pin 613. The front cap 620 further includes a through tip hole 623 that is communicated with the pivot pin hole 621 such that a writing instrument 625, such as a refill, can be accommodated in the hole 612 to extend through the pivot pin hole 621 and to project from the tip hole 623 for writing purposes. Compared with the above-described preferred embodiments, the writing instrument 625 is accommodated in both the barrel body 610 and the front cap 620, and is of a longer length to make possible a longer period of writing.

Referring to FIG. 64, in another embodiment, a front section of the writing instrument 625' may be configured to pass through the pivot hole 621' and a bent through tip hole 623' of the front cap 62'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

Referring to FIGS. 65 to 68, the first preferred embodiment of a pen 1000 according to the present invention is shown to comprise a casing 1010 and a writing tip 1041. The casing 1010 includes an elongated first casing half 1002, and a second casing half 1003. The first casing half 1002 defines an interior chamber 1011 adapted to receive a pair of eyeglasses 1012, such as that shown in FIGS. 69 and 70, and has a front end 1021, a rear end 1022, and an opening 1241 that is formed between the front and rear ends 1021, 1022, and that is adapted to permit movement of the eyeglasses 1012 into the interior chamber 1011 therethrough. The first casing half 1002 further has a bowl-shaped bottom 1023 formed integrally with two curved partitions 1231 to confine the eyeglasses 1012 therebetween. In addition, the first casing half 1002 has an annular top frame 1024 which is mounted on the bottom 1023 by means of a bolt 1025, and which defines the opening 1241 therein. A recess 1243 is formed in the top frame 1024. The bottom 1023 is formed with two aligned integral abutment blocks 1232, whereas the top frame 1024 is formed with two inverted U-shaped integral abutment legs 1242 (see FIG. 3). The abutment legs 1242 are respectively fixed on the abutment blocks 1232. Furthermore, the bottom 1023 of the first casing half 2 has an L-shaped integral abutment plate 1234 that is adapted to permit abutment of a rear and of a writing instrument 1004 thereagainst. The writing instrument 1004 is provided with the above-mentioned writing tip 1041 and, in this embodiment, is a ball-point pen. Certainly, it may also be a pencil or a fountain pen. A front end notch 1233 is formed in the front end 21 of the first casing half 1002 to permit extension of the writing tip 1041 from the first casing half 1002 therethrough. The bottom 1023 further has tow parallel integral clamping plates 1235 that are provided between the abutment plate 1234 and the notch 233 for clamping the writing instrument 4 therebetween. The eyeglasses 1012 (see FIGS. 69 and 70) and the writing instrument 1004 are disposed on two sides of the partitions 1231.

The second casing half 1003, in this embodiment, includes a cover plate 1031 shaped to complement the opening 1241. The cover plate 1031 has a mounting side (3M) and a free side (3F). The mounting side (3M) is formed with two aligned integral pivot pins 1032 which extend outwardly from two opposite sides thereof, and which extend into the pivot holes between the abutment legs 1242 and the abutment blocks 1232. As such, the mounting side (3M) is mounted pivotally on the first casing half 1002 between the front and rear ends 1021,1022. The free side (3F) rests on the first casing half 1002 so that the cover plate 1031 covers the opening 1241 in the first casing half 1002. The free side (3F) has a tongue 1033 extending integrally therefrom to engage the recess 1243 in the top frame 1024 such that the free side (3F) can be retained releasably on the top frame 1024. The tongue 1033 is removable forcibly from the recess 1043 such that the free side (3F) is rotatable away from the opening 1241 to permit passage of the eyeglasses 1012 through the opening 1241.

Figure 66:
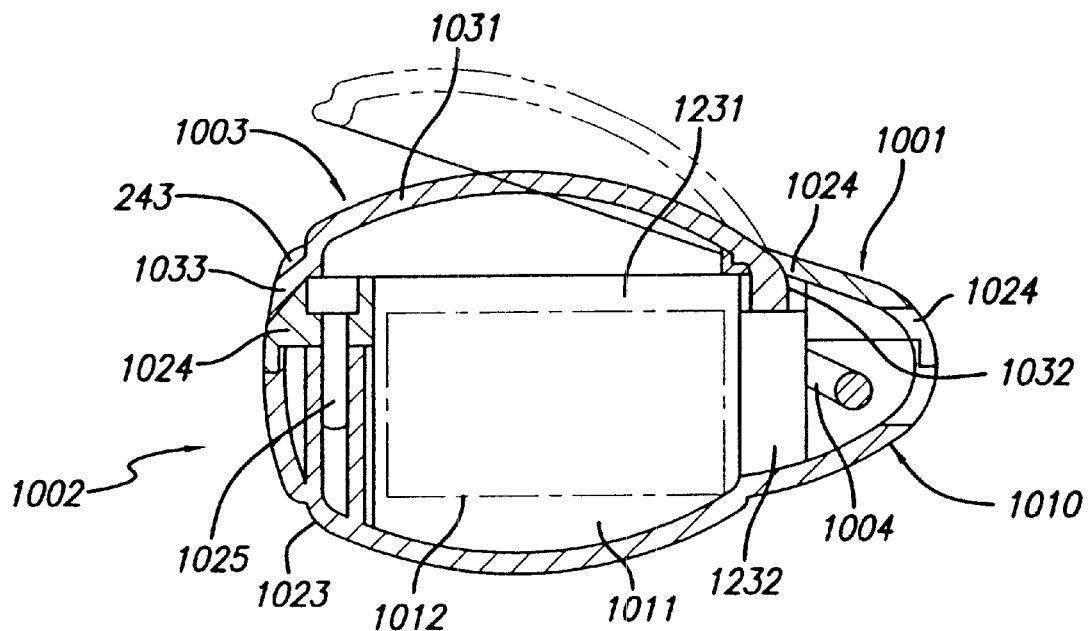
FIG. 66 is a sectional view of the FIG. 65 embodiment, taken along line II—II of FIG. 65.
Figure 67:
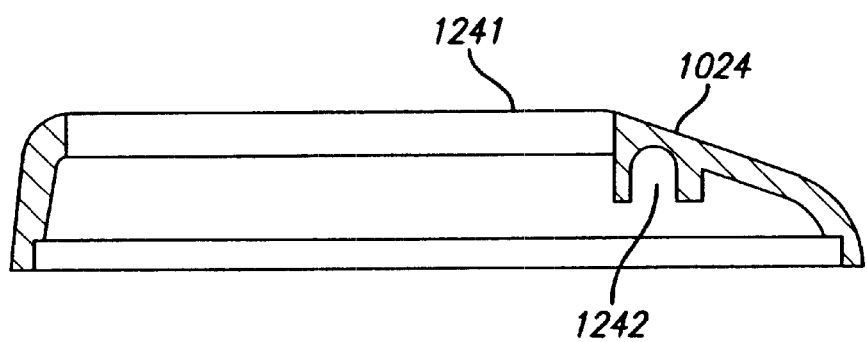
FIG. 67 is a sectional view of the FIG. 65 embodiment, taken along line III—III of FIG. 65.
Figure 68:
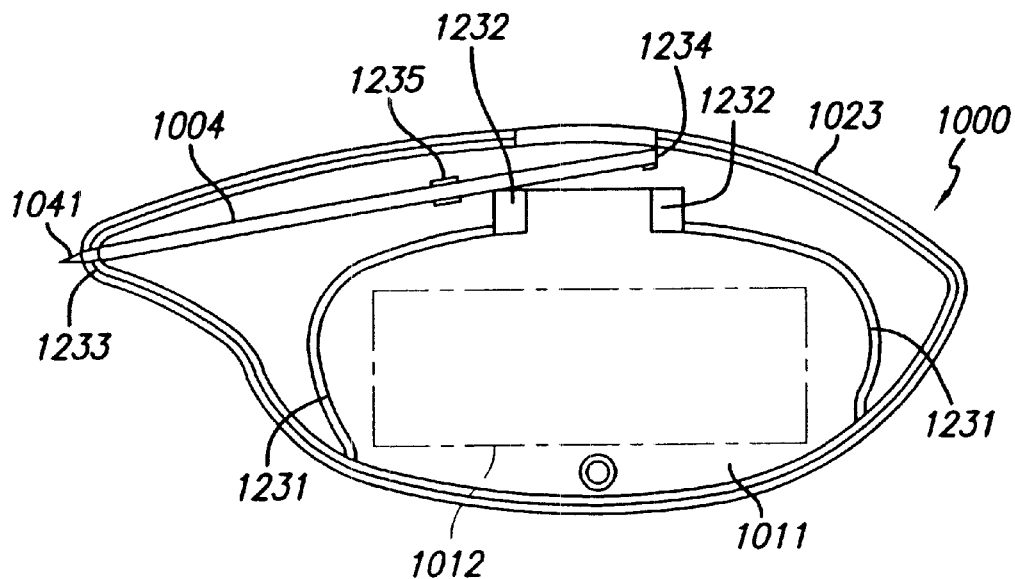
FIG. 68 is a schematic top view of the first casing half of the FIG. 65 embodiment.
Figure 69:
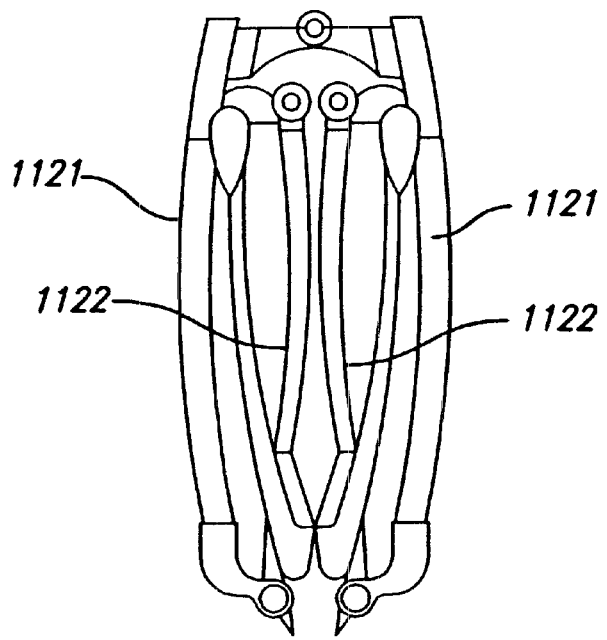
FIGS. 69 is and 70 illustrate a pair of foldable eyeglasses in extended and folded states, which can be stowed in the pen of the FIG. 65 embodiment.
Figure 70:
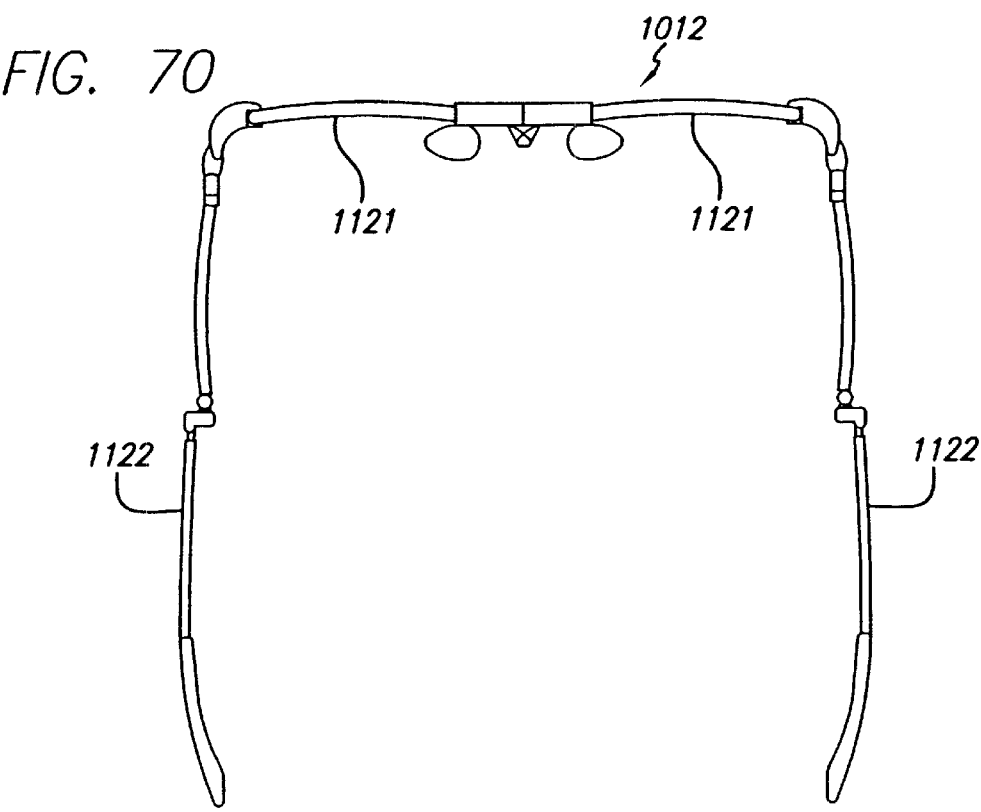

Referring to FIGS. 69 and 70, the eyeglasses 1012 in this embodiment are preferably of a foldable type having a pair of foldable lenses 1121 and a pair of foldable temples 1122 such that they can be folded compactly for placement in the interior chamber 11 (see FIG. 66).

Figure 71:
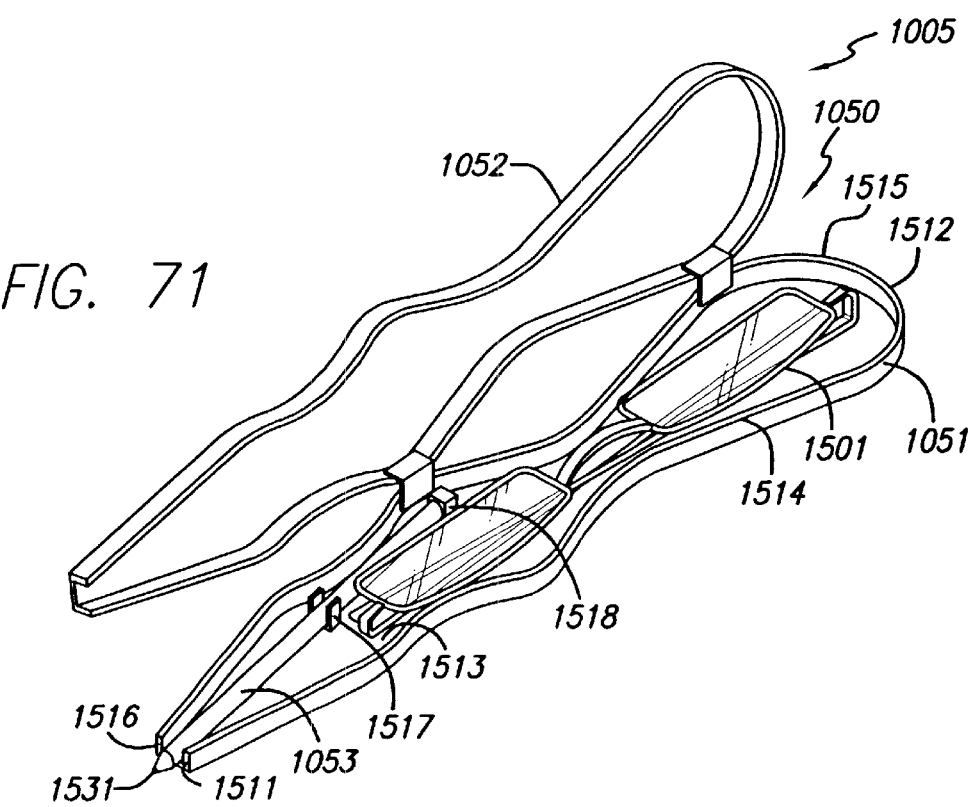
FIG. 71 is a perspective view of another embodiment of a pen for receiving eyeglasses according to the present invention.

FIG. 71 shows the second preferred embodiment of the present invention. A pen 1005 is shown to include an elongated casing 1050 having a wavy or guard-like contour, and a writing instrument 1053 with a writing tip 1531. In this embodiment, the writing instrument 1053 is a ball-point pen. The casing 1050 includes symmetrically shaped first and second casing halves 1051, 1052. The first casing half 1051 defines an interior chamber 513 adapted to receive a pair of eyeglasses 501 of a non-foldable type, and has a front and 511, a rear and 1512, and an opening 1515 formed between the front and rear ends 1511, 1512 and defined by a peripheral wall 1514 to permit access to the interior chamber 1513. The front end 1511 is formed with a notch 1516 for extension of the writing tip 1531 therethrough. An abutment plate 1518 is provided integrally on a bottom of the first casing half 1051 for abutment of a rear end of the writing instrument 1053 thereagainst. Two parallel integral clamping plates 1517 are disposed between the abutment plate 1518 and the notch 1516 for clamping the writing instrument 1053 therebetween. The second casing half 1052 is mounted pivotally to one side of the first casing half 1051, and is retained releasably on the other side thereof such that it is rotatable to permit or close access to the opening 1515.

Figure 72:
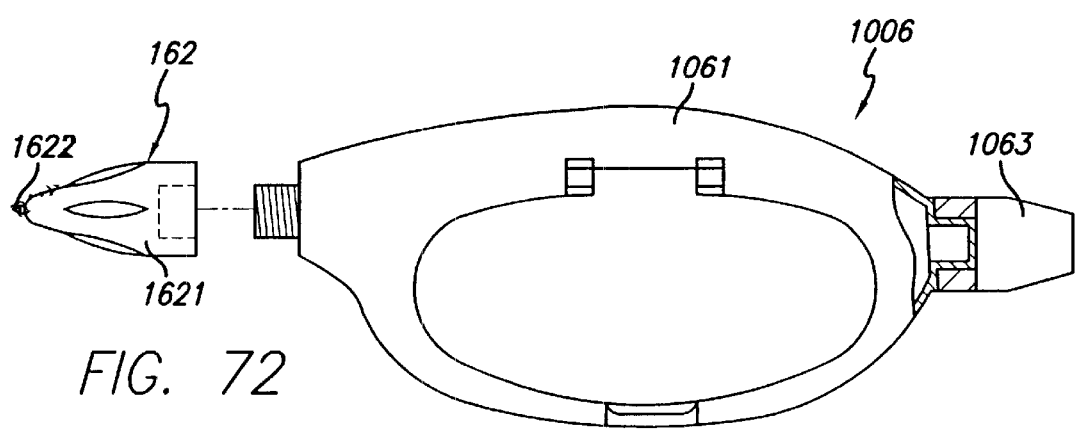
FIG. 72 is a top view of another embodiment of a pen for receiving eyeglasses according to the present invention.

FIG. 72 shows a pen 1006 of another embodiment of the present invention, which includes a first casing half 1061 and a writing instrument 1062. This embodiment differs from the first embodiment in that a rear and of the first casing half 1061 is provided with a flashlight 1063 mounted removably thereon. Besides, the writing tip 1622 is mounted in, and extends from a cap 1621 that engages threadedly a front end of the first casing half 1061.

Figure 73:
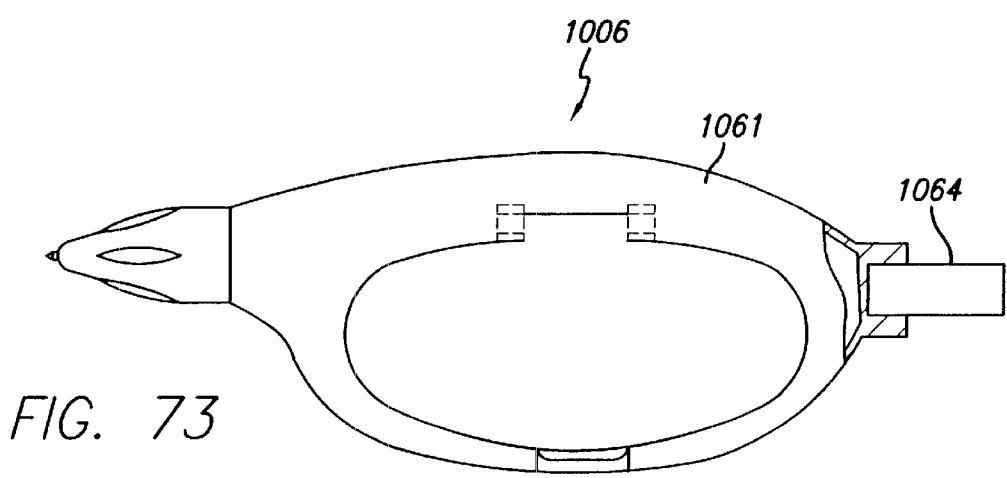
FIG. 73 is a top view of the FIG. 72 embodiment of a pen for receiving eyeglasses according to the present invention.

In another embodiment as shown in FIG. 73, the rear end of the first casing half 1061 of the pen 1006 is provided with a pen-track erasing member 1064 mounted removably thereon. The erasing member 2064 may be an eraser, or an applicator of a correction fluid holder (not shown).

Figure 74:
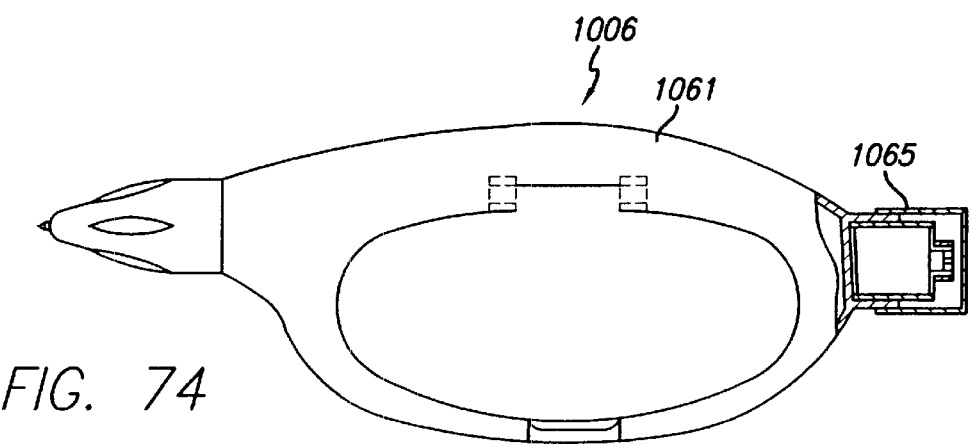
FIG. 74 is a top view of another embodiment of a pen for receiving eyeglasses according to the present invention.
Figure 75:
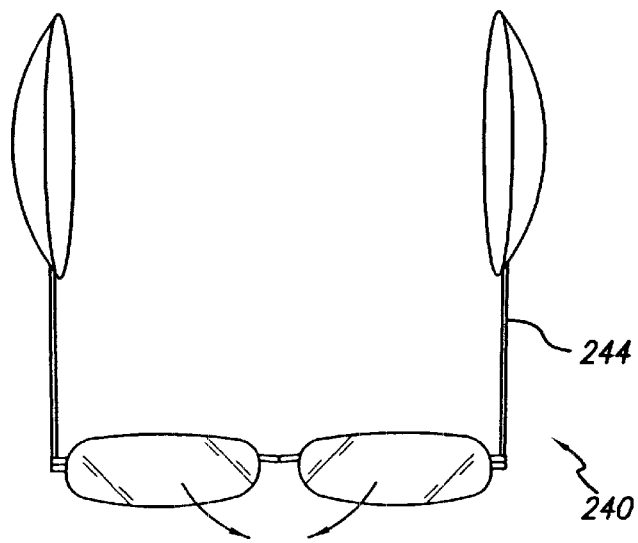
FIGS. 75–78 show another embodiment of folding eyeglasses of the present invention.

In the fifth preferred embodiment as shown in FIG. 74, the rear end of the first casing half 1061 of the pen is provided with a perfume container 1065 mounted removably thereon.

From the foregoing, it can be appreciated that since access to the interior of the pen is from a lateral side of the pen, instead of from the rear end, arrangement of an additional functional accessory, such as a flashlight, eraser, etc., at the rear end of the pen is easier in terms of manufacture and assembly. Furthermore, the pen can assume a shape other that the conventional cylindrical shape so as to provide more variety in design choices. For instance, in the second preferred embodiment, the pen 5 has an interesting wavy or gourd-like shape.

FIGS. 75–78 show a folding eyeglass frame 240 in which the glasses, when in the open position (FIG. 75) are configured to be worn in the conventional manner, and a closed position (FIG. 78) in which the lenses and all or a substantial portion of the frame are enclosed within clam shell like portions 242 of the frame 240 that serve as the ear rest portions of the arms 244. When in the folded the state, it is not apparent that the resulting object, which resembles a clam, contains a pair of glasses. The compact form the glasses take, when folded, provides apparent space saving benefits.

Figure 76:
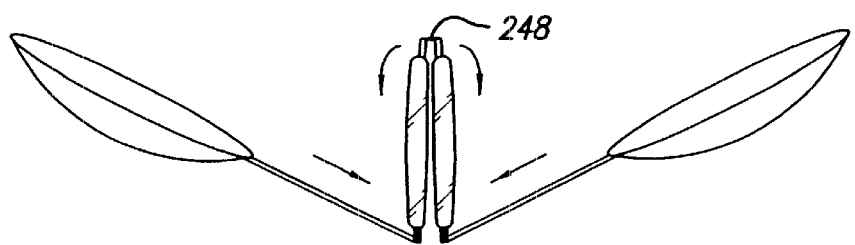
Figure 77:
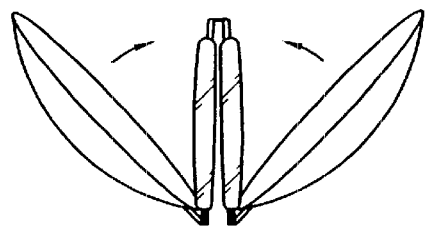
Figure 78:
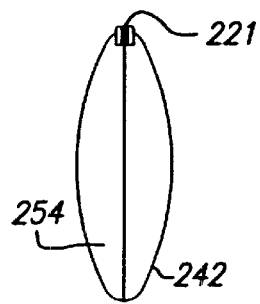

The glasses are provided with a front frame 246 including a pair of lens retaining members 250 joined together by a hinged bridge 248. The hinged bridge is constructed of two hinge forming members 249, each of which extends from the inward side of the lens retaining members 250. The hinge forming members are provided with apertures which are placed in alignment with each other and joined together by a screw, pin, bolt, or other known devices for joining a hinge. The glasses can be folded along the hinge, as shown in FIGS. 76–78. Here, during folding, the hinged bridge 248 is positioned in the space where the user's head would be when in the open position of FIG. 75. This is in distinction to the embodiment of FIGS. 49–53 where, during folding, the lens retaining members 250 are positioned in the space where the user's head would be when in the open position of FIG. 49. In other words, lens retaining members fold inward in FIGS. 49–53. They fold outward in the embodiment of FIGS. 75–78. A clasp 221 can be provided on the case to keep the clam shell like portions 242 in a closed position.

FIGS. 79–84 shows another embodiment of folding eyeglasses having case members having the components aforedescribed: a front frame 246, lens retaining members 250 joined together by a hinged bridge 248, clam shell like portions 242 of the frame 240 that serve as the ear rest portions of the arms 244. The hinged bridge is constructed of two hinge forming members 249, arms 244 attached to the outward sides of the lens retaining members 250 at hinges 251, the arms being constructed of a first relatively thin portion 252 that extends from the hinges 251, and concave shaped ear rests 254 are slidably mounted over the relatively thin portions 252. The concave shaped ear rests 254 have an open face 255 in the direction of the user's head.

Figures 79, 80:
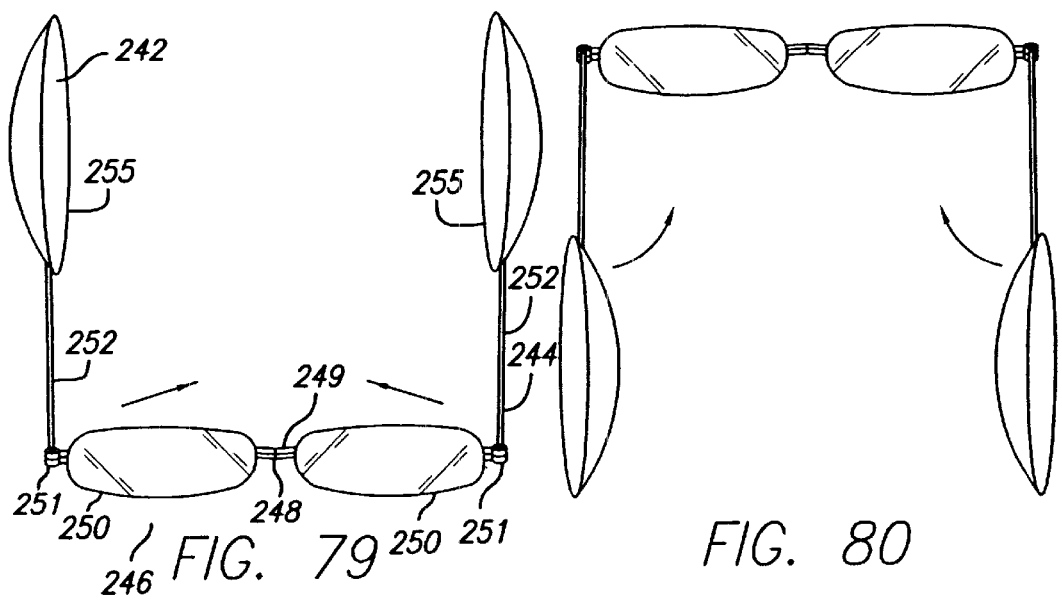
FIGS. 79–84 show another embodiment of folding eyeglasses of the present invention.
Figure 85:
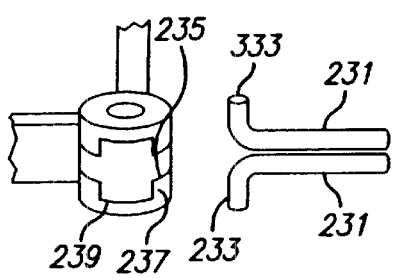
FIG. 85 shows an embodiment of a hinge suitable for use in the present invention.

FIG. 85 shows the hinge 251. A spring 233 constructed of resilient and flexible material is attached to an end of the relatively thin portions 252 of the arms 244. The spring has a two wires 231 extending in the direction of the arm, and a portion 233 attached to each wire that extends substantially perpendicular to the direction of the wires. The wires are fitted into hinges 251, which are provided with a slot 235 having a slot portion 237 extending around the periphery and a vertical slot portion 239 on the front side and rear side of the hinge. By squeezing the wires, the arms can be pivoted through the slot 235. The arms lock into either a front position or rear position when the wires enter the vertical slot portion 239 position, where they expand. When in the wear position, the arms are on the back side of the lens retaining members 250 (FIG. 79).

Figures 81, 82:
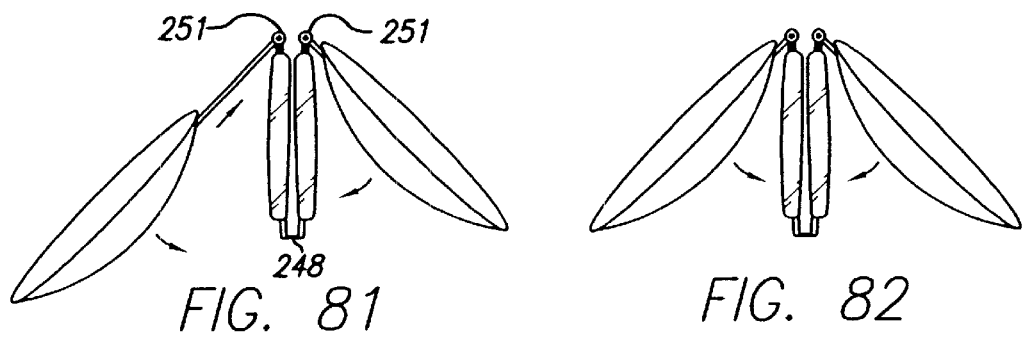
Figures 83, 84:
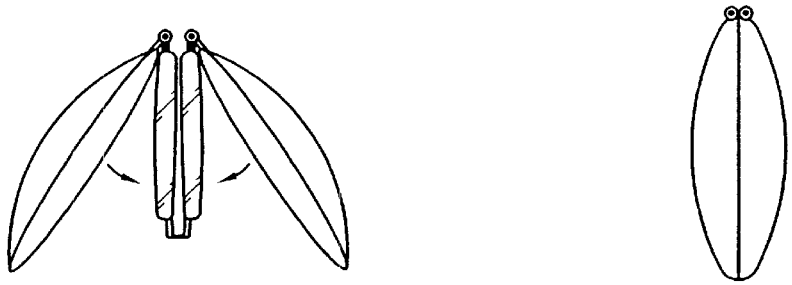

To fold the glasses, the arms 244 are moved to the front position (FIG. 80) and folded inward at the hinged bridge 248. The concave shaped ear rests are slid up towards hinge 251, and the arms 244 are brought closer to the lens retaining member 251 (FIG. 81). In this arrangement, the open face 255 of the concave shaped ear rests 254 face outward (FIG. 82). The concave shaped ear rests are then rotated to encase the lenses. The concave shaped ear rests can be made of a durable flexible plastic material that facilitates the rotating action.

While the present invention has been described in connection with particular embodiments, it is understood that this invention is not limited to the disclosed embodiments but is intended to cover various arrangements included within the spirit and scope of the broadest interpretation so as to encompass all such modifications and equivalent arrangemnents.

I claim:

1. A writing instrument comprised of:
   a case including a first end portion and a second end portion that when joined define an enclosed interior space in which an item can be placed;
   a writing implement affixed to the first end portion, the writing implement is pivotable in an arc with respect to the case between a writing position and a rest position;
   wherein when the first end portion and second end portion are separated, the interior space can be accessed for storing or removing the item.

2. The writing instrument of claim 1 wherein the second end portion is provided with an end wall integral with the second end portion.

3. The writing instrument of claim 1 wherein a time piece is positioned on the case.

4. In combination, the writing instrument of claim 3 and a pair of eyeglasses positioned within the interior space.

5. The writing instrument of claim 1 wherein the second end portion is provided with a lip for receiving the first end portion when the first end portion is joined to the second end portion.

6. The writing instrument of claim 1 wherein the writing implement is a pen.

7. The writing instrument of claim 1 wherein the writing implement is a pencil.

8. The writing instrument of claim 1 wherein the writing implement is affixed to the first end portion by a pin that extends through an aperture in the first end portion.

9. The writing instrument of claim 1 wherein when the writing implement is in the rest position, it lies against the case.

10. In combination, the writing instrument of claim 1 and a pair of eyeglasses positioned within the interior space.

11. A writing instrument comprised of:

a case including a first end portion and a second end portion that when joined define an enclosed interior space in which an item can be placed;

a writing implement affixed to the first end portion, the writing implement is pivotable about a pin extending through an aperture in the first end portion, the writing implement being pivotable between a writing position and a rest position;

wherein when the first end portion and second end portion are separated, the interior space can be accessed for storing and removing the item.

* * * * *

Disclaimer

6,474,892 — David Chao, Los Altos, CA (US). MULTI-PURPOSE CONTAINERS HAVING A FOLDABLE WRITING INSTRUMENT. Patent dated Nov. 5, 2002. Disclaimer filed Dec. 17, 2002, by the Assignee, Contour Optik, Inc.

Hereby disclaims claims 1, 2, 4-11 of said patent.

*(Official Gazette, August 26, 2003)*